US012328194B2

(12) United States Patent
Dimou et al.

(10) Patent No.: US 12,328,194 B2
(45) Date of Patent: Jun. 10, 2025

(54) REQUEST FOR A CANCELED HYBRID AUTOMATIC REPEAT REQUEST CODEBOOK

(71) Applicant: QUALCOMM Incorporated, San Diego, CA (US)

(72) Inventors: Konstantinos Dimou, San Francisco, CA (US); Yan Zhou, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/394,021

(22) Filed: Aug. 4, 2021

(65) Prior Publication Data

US 2023/0041222 A1 Feb. 9, 2023

(51) Int. Cl.
| | | |
|---|---|---|
| *H04W 72/04* | (2023.01) | |
| *H04B 7/0456* | (2017.01) | |
| *H04L 1/1812* | (2023.01) | |
| *H04L 1/1867* | (2023.01) | |
| *H04W 72/0446* | (2023.01) | |
| *H04W 72/1263* | (2023.01) | |
| *H04W 72/23* | (2023.01) | |

(52) U.S. Cl.
CPC ......... *H04L 1/1819* (2013.01); *H04B 7/0456* (2013.01); *H04L 1/1896* (2013.01); *H04W 72/0446* (2013.01); *H04W 72/1263* (2013.01); *H04W 72/23* (2023.01)

(58) Field of Classification Search
CPC ... H04L 1/1819; H04L 1/1896; H04L 1/1854; H04L 1/1685; H04B 7/0456; H04W 72/0446; H04W 72/1263; H04W 72/23
See application file for complete search history.

(56) References Cited

U.S. PATENT DOCUMENTS

| | | | |
|---|---|---|---|
| 2020/0077470 A1* | 3/2020 | Xiong | H04L 1/0013 |
| 2022/0109528 A1* | 4/2022 | Babaei | H04W 72/04 |
| 2022/0294591 A1* | 9/2022 | Liu | H04L 5/0091 |
| 2022/0330307 A1* | 10/2022 | Korhonen | H04L 1/1607 |
| 2022/0407631 A1* | 12/2022 | El Hamss | H04L 1/1861 |
| 2023/0023656 A1* | 1/2023 | Rastegardoost | H04W 72/0446 |

(Continued)

FOREIGN PATENT DOCUMENTS

WO  WO-2023006344 A1 *  2/2023

OTHER PUBLICATIONS

R1-2104217 Ericsson HARQ-ACK Enhancements for IIoT/URLLC, 3GPP TSG-RAN WG1 Meeting #105-e, e-Meeting, May 10-27, 2021 (Year: 2021).*

(Continued)

*Primary Examiner* — Mahbubul Bar Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may receive a request to transmit one or more canceled hybrid automatic repeat request (HARQ) codebooks, the one or more canceled HARQ codebooks having been scheduled for transmission within a time window preceding receiving the request. The UE may transmit the one or more canceled HARQ codebooks via one or more resources associated with the request. Numerous other aspects are described.

30 Claims, 11 Drawing Sheets

(56) References Cited

U.S. PATENT DOCUMENTS

2023/0299891 A1* 9/2023 Kittichokechai ..... H04L 1/1896 370/336
2023/0379920 A1* 11/2023 Deghel ............. H04W 72/1268

OTHER PUBLICATIONS

R1-2104802 Oppo Harq-Ack enhancements for Rel-17 URLLC/ IIoT, 3GPP TSG RAN WG1 #105-e, e-Meeting, May 10-27, 2021 (Year: 2021).*

R1-2104309 Nokia HARQ-ACK Feedback Enhancements for URLLC/ IIoT, 3GPP TSG RAN WG1 #105-e, e-Meeting, May 19-27, 2021 (Year: 2021).*

International Search Report and Written Opinion—PCT/US2022/073421—ISA/EPO—Sep. 20, 2022.

Qualcomm Incorporated: "HARQ-ACK Enhancement for IOT and URLLC", 3GPP TSG RAN WG1 #104bis, R1-2103163, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177963, 23 Pages, Section 7, Section 5—Retransmission of dropped HARQ-ACK, pp. 1, 12,3,18 figure 9.

Qualcomm Incorporated: "HARQ-ACK Enhancement for IOT and URLLC", 3GPP TSG RAN WG1 #104-e, R1-2101459, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, pp. 1-17, XP051971624, Section 5—Retransmission of dropped HARQ-ACK, pp. 1, 10, figures 2, 9.

Qualcomm Incorporated: "HARQ-ACK Enhancement for IOT and URLLC", R1-2009257, 3GPP TSG RAN WG1 #103-e, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 26, 2020-Nov. 13, 2020, Oct. 24, 2020, XP051946920, 11 Pages, Section 2 "Transmisison of dropped SPS A/N", Section 5 "Retransmission of cancelled, HARQ-ACK", Section 1—Introduction, pp. 1,2,6,7, figures 1,7.

\* cited by examiner

REQUEST FOR A CANCELED HYBRID AUTOMATIC REPEAT REQUEST CODEBOOK

FIELD OF THE DISCLOSURE

Aspects of the present disclosure generally relate to wireless communication and to techniques and apparatuses for a request for a canceled hybrid automatic repeat request codebook.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a UE. The method may include receiving a request to transmit one or more canceled hybrid automatic repeat request (HARQ) codebooks, the one or more canceled HARQ codebooks having been scheduled for transmission within a time window preceding receiving the request. The method may include transmitting the one or more canceled HARQ codebooks via one or more resources associated with the request.

Some aspects described herein relate to a method of wireless communication performed by a base station. The method may include transmitting a request to transmit one or more canceled HARQ codebooks, the one or more canceled HARQ codebooks having been scheduled for transmission within a time window preceding transmitting the request. The method may include receiving the one or more canceled HARQ codebooks via one or more resources associated with the request.

Some aspects described herein relate to a method of wireless communication performed by a UE. The method may include transmitting a request to transmit one or more canceled HARQ codebooks, the one or more canceled HARQ codebooks having been scheduled for transmission within a time window preceding transmitting the request. The method may include receiving the one or more canceled HARQ codebooks via one or more resources associated with the request.

Some aspects described herein relate to a method of wireless communication performed by a base station. The method may include receiving a request to transmit one or more canceled HARQ codebooks, the one or more canceled HARQ codebooks having been scheduled for transmission within a time window preceding transmitting the request. The method may include transmitting the one or more canceled HARQ codebooks via one or more resources associated with the request.

Some aspects described herein relate to a UE for wireless communication. The user equipment may include a memory and one or more processors coupled to the memory. The one or more processors may be configured to receive a request to transmit one or more canceled HARQ codebooks, the one or more canceled HARQ codebooks having been scheduled for transmission within a time window preceding receiving the request. The one or more processors may be configured to transmit the one or more canceled HARQ codebooks via one or more resources associated with the request.

Some aspects described herein relate to a base station for wireless communication. The base station may include a memory and one or more processors coupled to the memory. The one or more processors may be configured to transmit a request to transmit one or more canceled HARQ codebooks, the one or more canceled HARQ codebooks having been scheduled for transmission within a time window preceding transmitting the request. The one or more processors may be configured to receive the one or more canceled HARQ codebooks via one or more resources associated with the request.

Some aspects described herein relate to a UE for wireless communication. The UE may include a memory and one or more processors coupled to the memory. The one or more processors may be configured to transmit a request to transmit one or more canceled HARQ codebooks, the one or more canceled HARQ codebooks having been scheduled for transmission within a time window preceding transmitting the request. The one or more processors may be configured to receive the one or more canceled HARQ codebooks via one or more resources associated with the request.

Some aspects described herein relate to a base station for wireless communication. The base station may include a memory and one or more processors coupled to the memory. The one or more processors may be configured to receive a request to transmit one or more canceled HARQ codebooks, the one or more canceled HARQ codebooks having been scheduled for transmission within a time window preceding transmitting the request. The one or more processors may be configured to transmit the one or more canceled HARQ codebooks via one or more resources associated with the request.

Some aspects described herein relate to a non-transitory computer-readable medium that stores a set of instructions for wireless communication by a UE. The set of instructions, when executed by one or more processors of the UE, may cause the UE to receive a request to transmit one or more canceled HARQ codebooks, the one or more canceled HARQ codebooks having been scheduled for transmission within a time window preceding receiving the request. The set of instructions, when executed by one or more processors of the UE, may cause the UE to transmit the one or more canceled HARQ codebooks via one or more resources associated with the request.

Some aspects described herein relate to a non-transitory computer-readable medium that stores a set of instructions for wireless communication by a base station. The set of instructions, when executed by one or more processors of the base station, may cause the base station to transmit a request to transmit one or more canceled HARQ codebooks, the one or more canceled HARQ codebooks having been scheduled for transmission within a time window preceding transmitting the request. The set of instructions, when executed by one or more processors of the base station, may cause the base station to receive the one or more canceled HARQ codebooks via one or more resources associated with the request.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to transmit a request to transmit one or more canceled HARQ codebooks, the one or more canceled HARQ codebooks having been scheduled for transmission within a time window preceding transmitting the request. The set of instructions, when executed by one or more processors of the one or more instructions that, when executed by one or more processors of a UE, may cause the one or more instructions that, when executed by one or more processors of a UE to receive the one or more canceled HARQ codebooks via one or more resources associated with the request.

Some aspects described herein relate to a non-transitory computer-readable medium that stores a set of instructions for wireless communication by a base station. The set of instructions, when executed by one or more processors of the base station, may cause the base station to receive a request to transmit one or more canceled HARQ codebooks, the one or more canceled HARQ codebooks having been scheduled for transmission within a time window preceding transmitting the request. The set of instructions, when executed by one or more processors of the base station, may cause the base station to transmit the one or more canceled HARQ codebooks via one or more resources associated with the request.

Some aspects described herein relate to an apparatus for wireless communication. The apparatus may include means for receiving a request to transmit one or more canceled HARQ codebooks, the one or more canceled HARQ codebooks having been scheduled for transmission within a time window preceding receiving the request. The apparatus may include means for transmitting the one or more canceled HARQ codebooks via one or more resources associated with the request.

Some aspects described herein relate to an apparatus for wireless communication. The apparatus may include means for transmitting a request to transmit one or more canceled HARQ codebooks, the one or more canceled HARQ codebooks having been scheduled for transmission within a time window preceding transmitting the request. The apparatus may include means for receiving the one or more canceled HARQ codebooks via one or more resources associated with the request.

Some aspects described herein relate to an apparatus for wireless communication. The apparatus may include means for transmitting a request to transmit one or more canceled HARQ codebooks, the one or more canceled HARQ codebooks having been scheduled for transmission within a time window preceding transmitting the request. The apparatus may include means for receiving the one or more canceled HARQ codebooks via one or more resources associated with the request.

Some aspects described herein relate to an apparatus for wireless communication. The apparatus may include means for receiving a request to transmit one or more canceled HARQ codebooks, the one or more canceled HARQ codebooks having been scheduled for transmission within a time window preceding transmitting the request. The apparatus may include means for transmitting the one or more canceled HARQ codebooks via one or more resources associated with the request.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
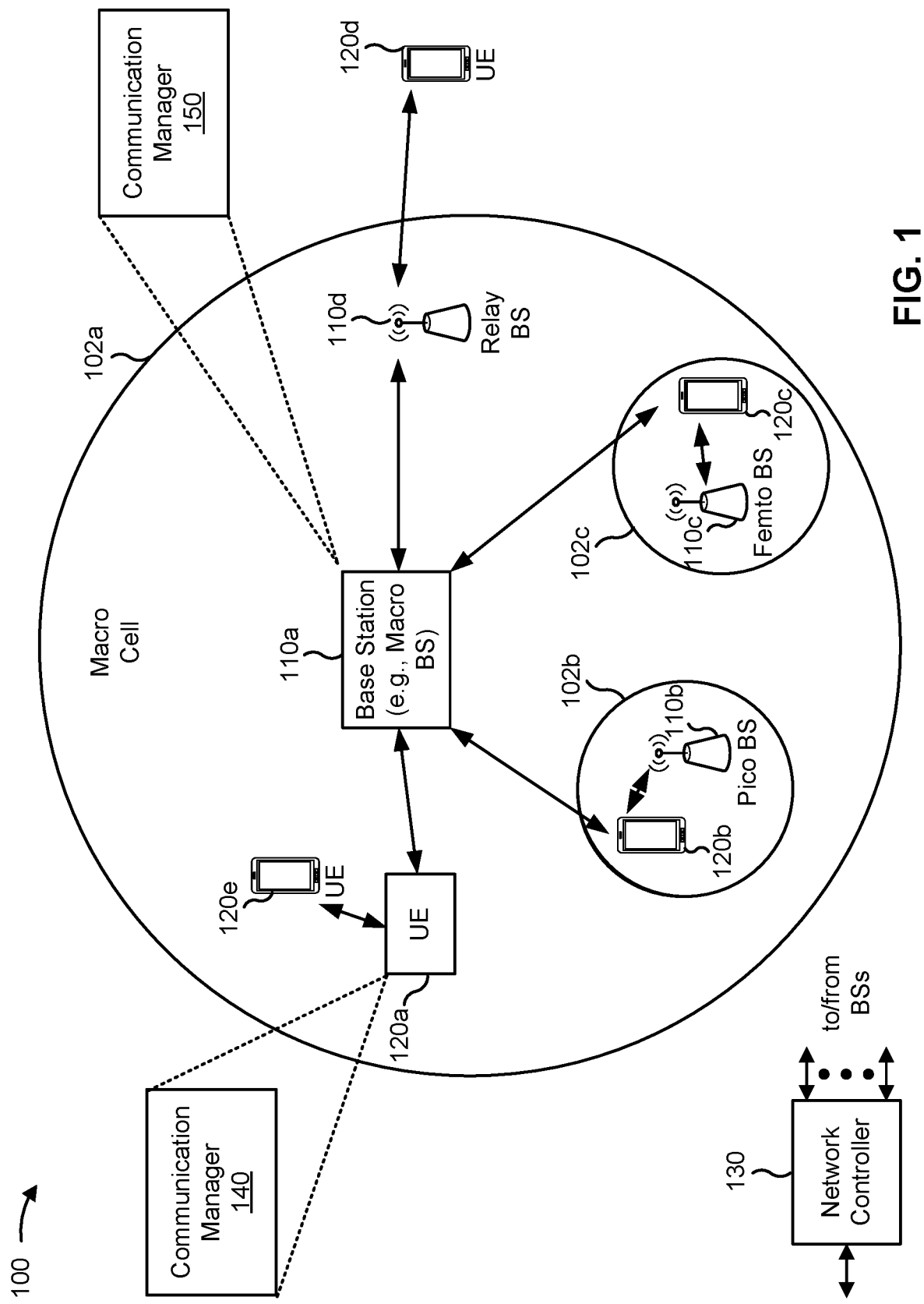
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown)

in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a request to transmit one or more canceled HARQ codebooks, the one or more canceled HARQ codebooks having been scheduled for transmission within a time window preceding receiving the request; and transmit the one or more canceled HARQ codebooks via one or more resources associated with the request. Additionally, or alternatively, the communication manager 140 may perform one or more other operations described herein.

In some aspects, the base station 110 may include a communication manager 150. As described in more detail elsewhere herein, the communication manager 150 may transmit a request to transmit one or more canceled HARQ codebooks, the one or more canceled HARQ codebooks having been scheduled for transmission within a time window preceding transmitting the request; and receive the one or more canceled HARQ codebooks via one or more resources associated with the request. Additionally, or alternatively, the communication manager 150 may perform one or more other operations described herein.

In some aspects, the UE 120 may include a communication manager 140. As described in more detail elsewhere herein, the communication manager 140 may transmit a request to transmit one or more canceled HARQ codebooks, the one or more canceled HARQ codebooks having been scheduled for transmission within a time window preceding transmitting the request; and receive the one or more canceled HARQ codebooks via one or more resources associated with the request. Additionally, or alternatively, the communication manager 140 may perform one or more other operations described herein.

In some aspects, the base station 110 may include a communication manager 150. As described in more detail elsewhere herein, the communication manager 150 may receive a request to transmit one or more canceled HARQ codebooks, the one or more canceled HARQ codebooks having been scheduled for transmission within a time window preceding transmitting the request; and transmit the one or more canceled HARQ codebooks via one or more resources associated with the request. Additionally, or alternatively, the communication manager 150 may perform one or more other operations described herein.

As indicated above, FIG. 1 is provided as an example. Other examples may differ from what is described with regard to FIG. 1.

Figure 2:
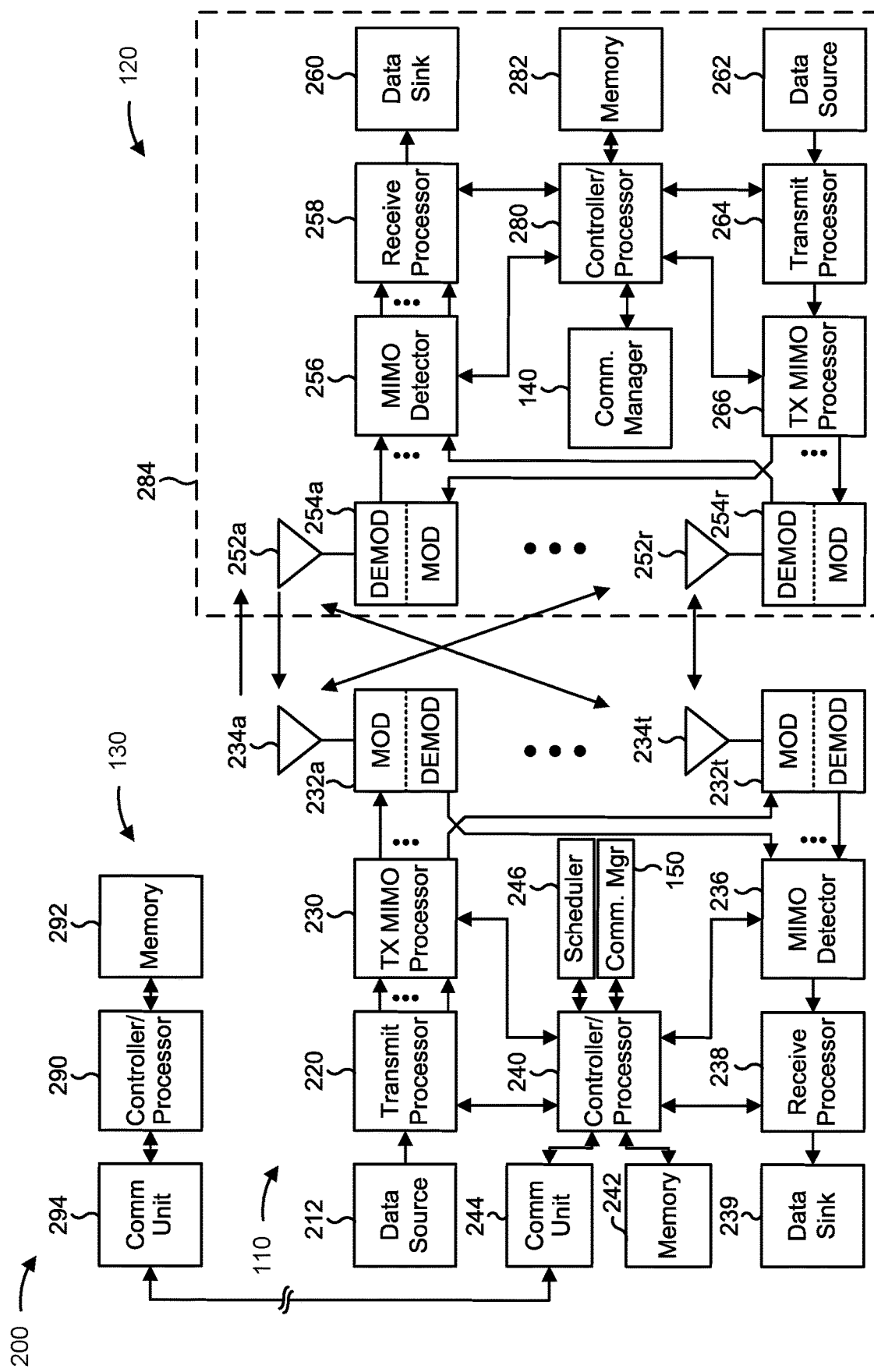
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with a request for a canceled hybrid automatic repeat request (HARQ) codebook, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for receiving a request to transmit one or more canceled HARQ codebooks, the one or more canceled HARQ codebooks having been scheduled for transmission within a time window preceding receiving the request; and/or means for transmitting the one or more canceled HARQ codebooks via one or more resources associated with the request. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a request to transmit one or more canceled HARQ codebooks, the one or more canceled HARQ codebooks having been scheduled for transmission within a time window preceding transmitting the request; and/or means for receiving the one or more canceled HARQ codebooks via one or more resources associated with the request. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for transmitting a request to transmit one or more canceled HARQ codebooks, the one or more canceled HARQ codebooks having been scheduled for transmission within a time window preceding transmitting the request; and/or means for receiving the one or more canceled HARQ codebooks via one or more resources associated with the request. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving a request to transmit one or more canceled HARQ codebooks, the one or more canceled HARQ codebooks having been scheduled for transmission within a time window preceding the request; and/or means for transmitting the one or more canceled HARQ codebooks via one or more resources associated with the request. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
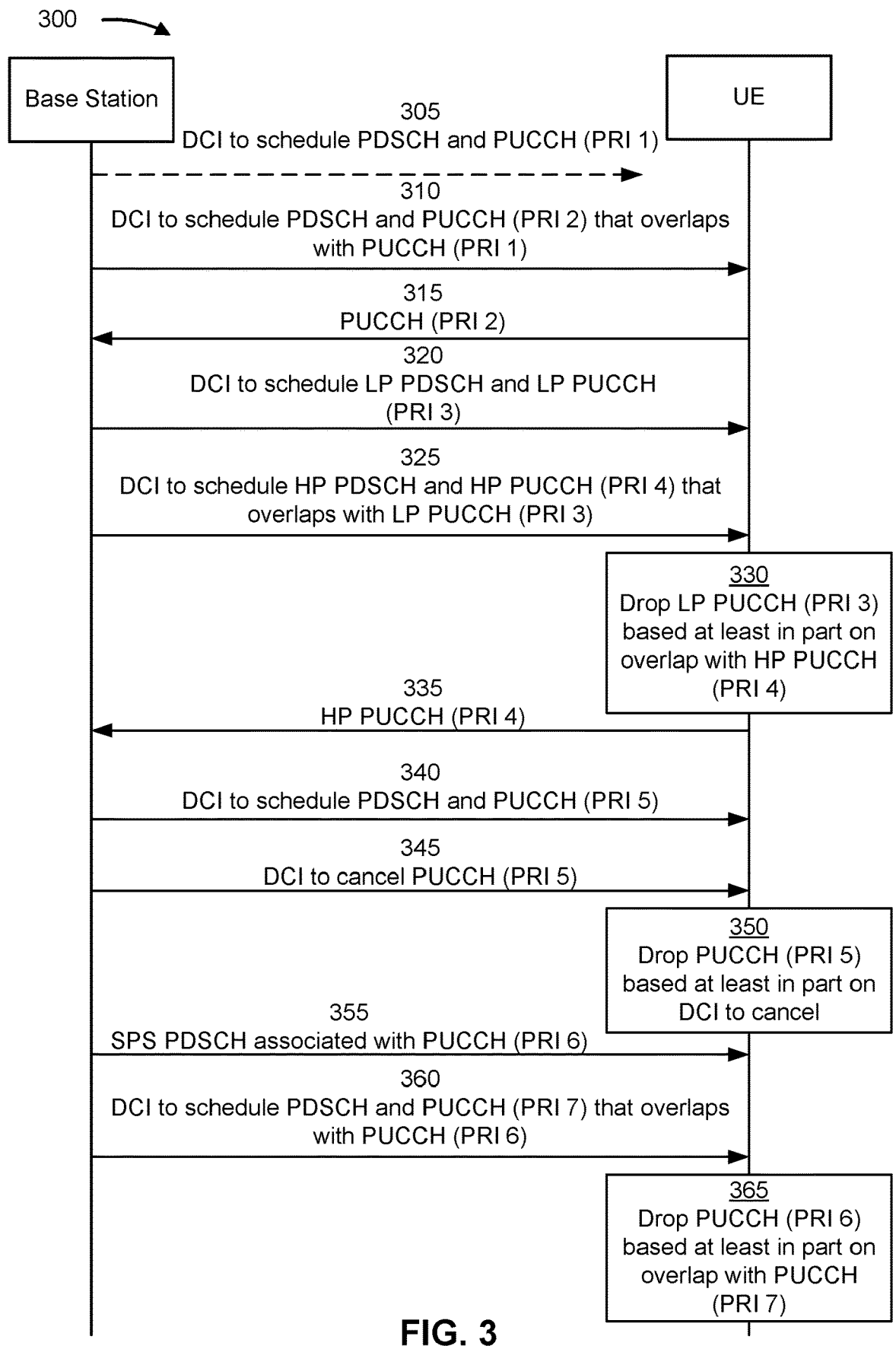
FIG. 3 is a diagram illustrating an example of canceled hybrid automatic repeat request codebooks, in accordance with the present disclosure.

FIG. 3 is a diagram illustrating an example 300 of canceled HARQ codebooks, in accordance with the present disclosure. As shown in FIG. 3, a base station may communicate with a UE. In some aspects, the base station and the UE may be part of a wireless network. The UE and the base station may have established a wireless connection prior to operations shown in FIG. 3.

As shown in FIG. 3, and by reference number 305, the base station may transmit downlink control information (DCI) to schedule a physical downlink shared channel (PDSCH) and a physical uplink control channel (PUCCH) associated with the PDSCH. For example, the DCI may indicate resources for the UE to monitor for a downlink communication (e.g., a PDSCH communication). The DCI may also indicate resources for transmitting HARQ feedback (e.g., one or more HARQ codebooks), via the PUCCH (associated with a PUCCH resource indicator (PRI) 1), to indicate whether the downlink communication was received. In some examples, the DCI may include a K1 indicator that indicates a timing offset between the PDSCH and the PUCCH. A PRI is a field of DCI that indicates a resource for a PUCCH by reference to a configured resource list.

As shown in FIG. 3, the UE does not receive the DCI and is unaware of resources to receive the downlink communication or to transmit the HARQ feedback. In this case, the UE fails to transmit the HARQ feedback because the DCI was lost.

As shown by reference number 310, the base station may transmit, and the UE may receive, DCI to schedule the PDSCH and an associated PUCCH (associated with a PRI 2) that overlaps with the PUCCH (PRI 1). The overlap may be an overlap (partial or complete overlap) in time on different frequencies or an overlap in time and frequency. For example, the PUCCH (PRI 1) may be scheduled for transmission via a first set of resources that occur at a same time as at least one resource of a second set of resources that are scheduled for PUCCH (PRI 2).

As shown by reference number 315, the UE may transmit, and the base station may receive, the HARQ feedback via the PUCCH (PRI 2) that is associated with the PDSCH described in connection with reference number 310. The PUCCH (PRI 1) may be lost based at least in part on the UE failing to receive the DCI that scheduled the PUCCH (PRI 1).

As shown by reference number 320, the base station may transmit DCI to schedule the PDSCH for a low priority (LP) communication and an associated PUCCH having low priority. For example, the DCI may indicate resources for the UE to monitor for a low priority downlink communication (e.g., an LP PDSCH communication). The DCI may also indicate resources for transmitting low priority HARQ feedback (e.g., one or more HARQ codebooks), via the PUCCH (associated with a PRI 3), to indicate whether the low priority downlink communication was received. In some examples, the DCI may include a K1 indicator that indicates a timing offset between the PDSCH and the PUCCH.

As shown by reference number 325, the base station may transmit, and the UE may receive, DCI to schedule the PDSCH for a high priority (HP) communication and an associated high priority PUCCH (associated with a PRI 4) that overlaps with the PUCCH (PRI 3). The overlap may be an overlap (partial or complete overlap) in time on different frequencies or an overlap in time and frequency. For example, the PUCCH (PRI 3) may be scheduled for transmission via a first set of resources that occur at a same time as at least one resource of a second set of resources that are scheduled for PUCCH (PRI 4).

As shown by reference number 330, the UE may drop the low priority PUCCH (PRI 3) based at least in part on the overlap with the high priority PUCCH (PRI 4).

As shown by reference number 335, the UE may transmit, and the base station may receive, the HARQ feedback via the high priority PUCCH (PRI 5) that is associated with the high priority PDSCH described in connection with reference number 325. In this way, the low priority PUCCH (PRI 3) may be canceled based at least in part on the UE dropping the PUCCH (PRI 3) to prioritize the transmission of the high priority PUCCH (PRI 4).

As shown by reference number 340, the base station may transmit DCI to schedule the PDSCH and an associated PUCCH (PRI 5). For example, the DCI may indicate resources for the UE to monitor for a downlink communication and may also indicate resources for transmitting HARQ feedback via the PUCCH (associated with a PRI 5), to indicate whether the downlink communication was received. In some examples, the DCI may include a K1 indicator that indicates a timing offset between the PDSCH and the PUCCH.

As shown by reference number 345, the base station may transmit, and the UE may receive, DCI to cancel the PUCCH (PRI 5). As shown by reference number 350, the UE may drop the PUCCH (PRI 5) based at least in part on the DCI indicating to cancel the PUCCH (PRI 5). In this way, the PUCCH (PRI 5) may be canceled based at least in part on the UE dropping the PUCCH (PRI 5) as indicated in the DCI to cancel.

As shown by reference number 350, the UE may receive a semi-persistent scheduling (SPS)-based PDSCH associated with a PUCCH (PRI 6). For example, the UE may be configured with a series of PDSCH occasions and a series of associated PUCCH occasions to be used to transmit HARQ feedback for communications received via the series of PDSCH occasions.

As shown by reference number 355, the UE may receive DCI to schedule the PDSCH and an associated PUCCH (PRI 7) that overlaps with the PUCCH (PRI 6). The overlap may be an overlap (partial or complete overlap) in time on different frequencies or an overlap in time and frequency. For example, The PUCCH (PRI 6) may be scheduled for transmission via a first set of resources that occur at a same time as at least one resource of a second set of resources that are scheduled for PUCCH (PRI 7).

As shown by reference number 360, the UE may drop the PUCCH (PRI 6) based at least in part on the DCI scheduling the PUCCH (PRI 6) overlapping with the PUCCH (PRI 7). In this way, the SPS-based PUCCH (PRI 6) may be canceled based at least in part on the UE dropping the PUCCH (PRI 6) to prioritize the transmission of the DCI-scheduled PUCCH (PRI 7).

As described herein, the UE may prepare a HARQ codebook (e.g., HARQ feedback) that is canceled (e.g., HARQ codebooks scheduled for transmission via PUCCH (PRI 3), PUCCH (PRI 5), and/or PUCCH (PRI 6)). Based at least in part on the HARQ codebook being canceled, the base station may be unaware regarding reception of an associated PDSCH communication. This may cause the base station to assume successful reception, which may result in communication errors and/or consumption of computing, power, communication, and/or network resources to detect and correct. Alternatively, this may cause the base station to assume unsuccessful reception, which may result in re-transmission of the associated PDSCH communication, consuming computing, power, communication, and/or network resources to re-transmit a previously-received communication unnecessarily.

As indicated above, FIG. 3 is provided as an example. Other examples may differ from what is described with regard to FIG. 3.

In some aspects described herein, a receiving device may receive a request (e.g., via DCI) to transmit one or more canceled HARQ codebooks that were scheduled for transmission within a time window preceding reception of the request. A HARQ codebook is information including a set of HARQ feedback values (e.g., ACK/NACKs) in positions corresponding to a set of communications to which the set of HARQ feedback values relate. The positions may be based at least in part on downlink assignment indexes of DCI messages scheduling the set of communications. The time window may be defined as a duration of time extending between reception of the request and a number of slots from reception of the request. The number of slots may be indicated in DCI (e.g., along with the request), in one or more medium access control (MAC) control elements (MAC CEs), in radio resource control (RRC) signaling, and/or within a communication protocol, among other examples.

The one or more canceled HARQ codebooks may be canceled based at least in part on intra-UE multiplexing (e.g., dropping to prioritize a higher priority transmission), reception of a cancelation indication indicating to cancel transmission of the one or more HARQ codebooks, collision of an SPS-based HARQ codebook with a dynamically scheduled HARQ codebook, and/or a combination of thereof, among other examples. In some aspects, the one or more canceled HARQ codebooks may be Type 1 HARQ codebooks (sometimes referred to as semi-static HARQ codebooks) and/or Type 2 HARQ codebooks (sometimes referred to as dynamic HARQ codebooks), among other examples. A Type 1 HARQ codebook may include a fixed number of bits and/or HARQ feedback values and a Type 2 HARQ codebook may include a variable number of bits and/or HARQ feedback values corresponding to a number of received DCI.

In some aspects, the receiving device may transmit the one or more canceled HARQ codebooks based at least in part on an indication from a transmitting device, a transmission by the receiving device (e.g., configuring the transmitting device), and/or a communication protocol. The one or more canceled HARQ codebooks may consist of a latest canceled HARQ codebook within the time window, an earliest canceled HARQ codebook within the time window, a canceled HARQ codebook having an index (e.g., a configured index or an indicated index) within the set of canceled HARQ codebooks, or all canceled HARQ codebooks within the time window.

In some aspects, the transmitting device (e.g., a base station) may perform blind detection to receive the one or more canceled HARQ codebooks, in case an expected canceled HARQ codebook is associated with lost DCI (e.g., as described in connection with reference number 305). The transmitting device may transmit the request for the receiving device to transmit the one or more canceled HARQ codebooks when multiple HARQ codebooks were canceled within the time window. If DCI associated with at least one of the one or more canceled HARQ codebooks was lost, the transmitting device and the receiving device may not be synchronized on identifications of the one or more canceled HARQ codebooks. For example, if the request is associated with an earliest canceled HARQ codebook and DCI associated with the earliest canceled HARQ codebook was lost, the transmitting device may expect the earliest canceled HARQ codebook on associated resources, and the UE may transmit the second-earliest canceled HARQ codebook on associated resources (e.g., different from resources associated with the earliest canceled HARQ codebook).

To account for potential asynchronization on identifications of the one or more canceled HARQ codebooks, the transmitting device may monitor resources associated with expected transmission of the one or more canceled HARQ codebooks as well as resources associated with additional canceled HARQ codebooks and/or lost DCIs. The transmitting device may monitor the resources associated with PRIs of the one or more canceled HARQ codebooks as well as PRIs associated with additional canceled HARQ codebooks and/or lost DCIs in parallel (e.g., simultaneously) and may parse sampled signals from the resources. For example, the transmitting device may parse the sampled signals with an assumption of synchronization and then parse the sampled signals with an assumption of one lost DCI, then two lost DCI, etc. (e.g., starting with an earliest PRI and then a second-earliest PRI etc., or starting with a latest PRI and then a second-latest PRI, depending on a configuration). In some aspects, if a requested canceled HARQ codebook is unavailable to the receiving device, the receiving device may not transmit any canceled HARQ codebooks.

In some aspects, the base station may schedule communications in a way that avoids having multiple canceled HARQ codebooks within the time window. For example, the base station may avoid scheduling, within a duration of the time window, more than one of dynamic-based HARQ codebooks scheduled during a scheduled SPS-based control channel (e.g., PUCCH), high priority HARQ codebooks scheduled during a scheduled low priority control channel, or transmission of a cancelation indication to cancel a HARQ codebook. The base station may be configured with a canceled HARQ codebook prohibit timer that prohibits causing cancelation of a second HARQ codebook within a duration of the prohibit timer. For example, after causing cancelation of a first HARQ codebook, the prohibit timer may begin. The base station is prohibited from causing cancelation of a second HARQ codebook until expiration of the prohibit timer. The prohibit timer may reset upon expiration of the duration of time associated with the time window and/or upon transmission of the request to transmit the one or more canceled HARQ codebooks.

In some aspects, the request may include a set of information. For example, the request may include a 4-bit request field that includes 1 bit that triggers the request for the one or more canceled HARQ codebooks (e.g., an earliest canceled HARQ codebook such as a colliding HARQ codebook, a dropped codebook, and/or a canceled codebook, among other examples) and 3 bits that indicate a window size (e.g., a number of slots and/or a selection of a candidate window size of a set of candidate window sizes). Alternatively, the request may include a 1-bit request field that triggers the request (e.g., the window size may be configured before transmission of the request).

In some aspects, the request may include a K1 value that indicates timing for the receiving device to transmit the one or more canceled HARQ codebooks.

In some aspects, the request may include an indication of a PRI for transmission of the one or more canceled HARQ codebooks. For example, the indication of the PRI may indicate to use the same PRI as originally indicated for the one or more canceled HARQ codebooks. Alternatively, the indication of the PRI may indicate to use a different PRI.

In some aspects, the request may indicate a priority of the transmission of the one or more canceled HARQ codebooks. In some aspects, the priority may be the same priority originally configured for the one or more canceled HARQ codebooks or may be different. For example, the transmission of the one or more canceled HARQ codebooks may be configured with a high priority based at least in part on the one or more canceled HARQ codebooks having been previously canceled.

In some aspects, the transmitting device may be a UE, and the receiving device may be a base station. Alternatively, the transmitting device may be a base station, and the receiving device may be a UE.

Based at least in part on the transmitting device being configured to request a canceled HARQ codebook, the transmitting device may receive the canceled HARQ codebook, which may avoid the transmitting device being unaware of whether the transmissions associated with the canceled HARQ codebook were received by the receiving device. This may reduce communication errors and/or unnecessary retransmissions of received communications, which may reduce consumption of computing, power, communication, and/or network resources to detect and correct.

Figure 4:
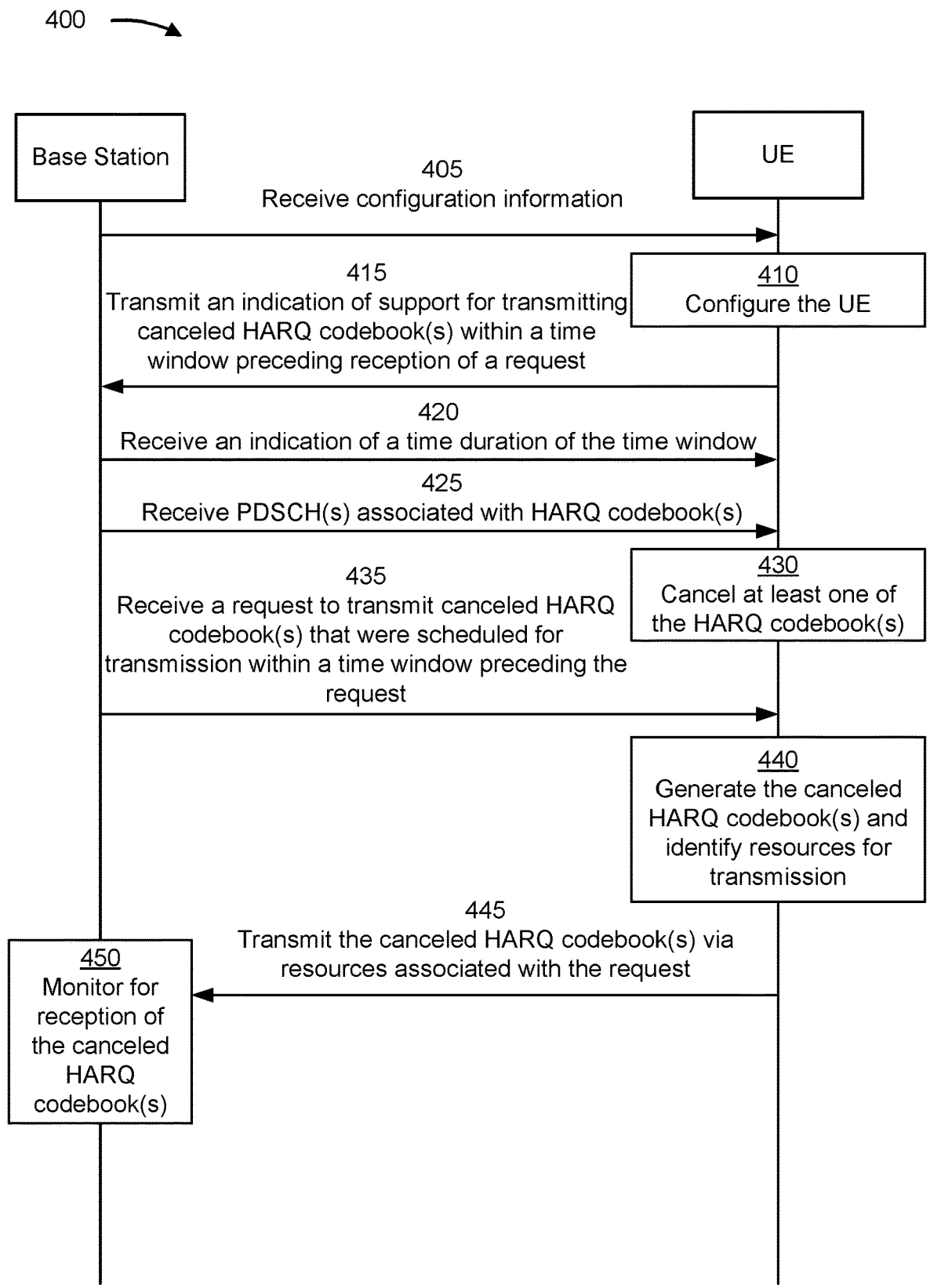
FIGS. 4 and 5 are diagrams illustrating examples associated with a request for a canceled hybrid automatic repeat request codebook, in accordance with the present disclosure.

FIG. 4 is a diagram illustrating an example 400 associated with a request for a canceled HARQ codebook, in accordance with the present disclosure. As shown in FIG. 4, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 4.

As shown by reference number 405, the base station may transmit, and the UE may receive, configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit one or more canceled HARQ codebooks within a time window preceding reception of a request. In some aspects, the configuration information may indicate a configuration for selecting a canceled HARQ codebook from a set of canceled HARQ codebooks within the time window. For example, the configuration information may indicate that the UE is to select an earliest canceled HARQ codebook within the time window, a latest canceled HARQ codebook within the time window, a canceled HARQ codebook having an index (e.g., a configured index) within the set of canceled HARQ codebooks, or all canceled HARQ codebooks within the time window, among other examples. In some aspects, the configuration information may indicate a set of candidate selections, from which the base station may indicate the selection. In some aspects, the configuration information may indicate a time duration of the time window and/or may indicate a set of candidate time durations, from which the base station may indicate the time duration.

As shown by reference number 410, the UE may configure the UE based at least in part on the configuration information. In some aspects, the UE may be configured to perform one or more operations described herein based at least in part on the configuration information.

As shown by reference number 415, the UE may transmit, and the base station may receive, an indication of support for transmitting one or more canceled HARQ codebooks within a time window preceding reception of a request. In some aspects, the UE may transmit the indication of support via RRC signaling (e.g., as part of an RRC connection process).

As shown by reference number 420, the UE may receive, and the base station may transmit, an indication of a time duration of the time window. In some aspects, the time window may extend from reception of a request to a slot that is a number of slots before reception of the request. The number of slots may be considered the time duration of the time window. In some aspects, the UE may receive and/or determine the time duration of the time window (e.g., the number of slots) via the request (e.g., DCI with the request for lowest latency for a change in time duration), one or more MAC CEs (to reduce overhead of DCI with a slightly larger latency), or RRC signaling (e.g., to reduce overhead in dynamic signaling with a largest latency).

As shown by reference number 425, the UE may receive, and the base station may transmit, one or more PDSCHs (e.g., PDSCH communications) associated with one or more HARQ codebooks. For example, the UE may receive one or more communications via one or more SPS-based PDSCH resources and/or one or more dynamically scheduled PDSCH resources. The one or more communications may be associated with low priority PUCCHs and/or high priority PUCCHs.

In some aspects, the base station may be configured to schedule communications for the UE associated with the one or more canceled HARQ codebooks such that the communications are scheduled to avoid multiple canceled HARQ codebooks within a same time window.

As shown by reference number 430, the UE may cancel at least one of the one or more HARQ codebooks. In some aspects, the UE may cancel at least one of the one or more HARQ codebooks based at least in part on intra-UE multiplexing (e.g., prioritization of one PUCCH over another based at least in part on priorities and/or being associated with dynamic-based or SPS-based PDSCH), reception of a cancelation indication, and/or a collision with a downlink communication (e.g., when an associated PUCCH is scheduled during a scheduled downlink communication).

As shown by reference number 435, the UE may receive, and the base station may transmit, a request to transmit one or more canceled HARQ codebooks that were scheduled for transmission within a time window preceding the request. In some aspects, the request may include an indication to transmit at least one canceled HARQ codebook, an indication of a number of slots within the time window, a DCI to HARQ feedback indicator, a resource indication for transmitting the one or more canceled HARQ codebooks, and/or a priority indicator for transmitting the one or more canceled HARQ codebooks. In some aspects, these parameters may be associated with matching parameters of the one or more canceled HARQ codebooks.

As shown by reference number 440, the UE may generate the one or more canceled HARQ codebooks and identify resources for transmission. In some aspects, the base station may identify the one or more canceled HARQ codebooks to include in the transmission based at least in part on an indication within the request, a communication protocol, RRC signaling (e.g., configuration information), and/or one or more MAC CEs. In some aspects, the UE may select the one or more canceled HARQ codebooks from a set of canceled HARQ codebooks within the time window. For example, the UE may select (e.g., based at least in part on being identified to include in the transmission) the one or more canceled HARQ codebooks consisting of an earliest canceled HARQ codebook within the time window, a latest canceled HARQ codebook within the time window, a canceled HARQ codebook having an index within the set of canceled HARQ codebooks, or all canceled HARQ codebooks within the time window, among other examples.

In some aspects, the UE may identify the resources for transmission based at least in part on an indication in the request. For example, the request may indicate a PRI for transmission of the request and/or may indicate to use a same PRI as originally configured for the one or more canceled HARQ codebooks (e.g., before being canceled). In some aspects, the UE may identify the resources for transmission based at least in part on a communication protocol and/or an indication in a communication that is separate from the request (e.g., RRC signaling or one or more MAC CEs, among other examples).

As shown by reference number 445, the UE may transmit, and the base station may receive, the one or more canceled HARQ codebooks via the resources associated with the request. For example, the UE may transmit the one or more canceled HARQ codebooks based at least in part on a PRI within the request or based at least in part on a PRI originally associated with the one or more canceled HARQ codebooks (e.g., before being canceled).

As shown by reference number 450, the base station may monitor for reception of the one or more canceled HARQ codebooks. For example, receiving the one or more canceled HARQ codebooks via the one or more resources associated with the request may include monitoring for reception of the one or more canceled HARQ codebooks within resources associated with a set of canceled HARQ codebooks within the time window (e.g., with the set of canceled HARQ codebooks including the one or more canceled HARQ codebooks). In this way, the base station may account for lost DCI causing asynchronization in identifying the one or more canceled HARQ codebooks within the set of canceled HARQ codebooks.

Based at least in part on the base station being configured to request a canceled HARQ codebook, the base station may receive the canceled HARQ codebook, which may avoid the base station being unaware of whether the transmissions associated with the canceled HARQ codebook were received by the UE. This may reduce communication errors and/or unnecessary retransmissions of received communications, which may reduce consumption of computing, power, communication, and/or network resources to detect and correct.

As indicated above, FIG. 4 is provided as an example. Other examples may differ from what is described with regard to FIG. 4.

Figure 5:
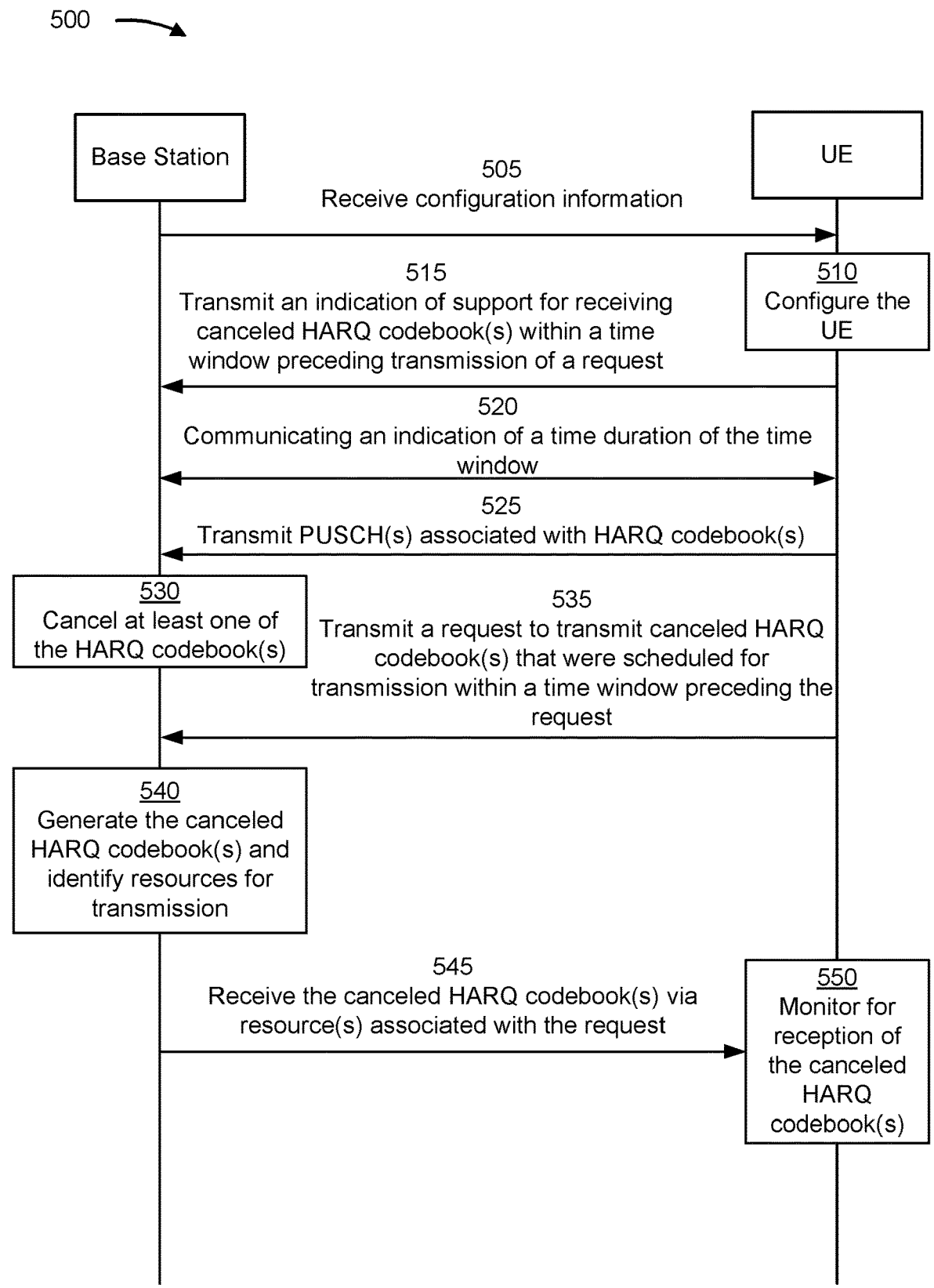

FIG. 5 is a diagram illustrating an example 500 associated with a request for a canceled HARQ codebook, in accordance with the present disclosure. As shown in FIG. 5, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 5.

As shown by reference number 505, the base station may transmit, and the UE may receive, configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit a request for the base station to transmit one or more canceled HARQ codebooks within a time window preceding reception of a request. In some aspects, the configuration information may indicate a configuration for selecting a canceled HARQ codebook from a set of canceled HARQ codebooks within the time window. For example, the configuration information may indicate that the base station is to select an earliest canceled HARQ codebook within the time window, a latest canceled HARQ codebook within the time window, a canceled HARQ codebook having an index (e.g., a configured index) within the set of canceled HARQ codebooks, or all canceled HARQ codebooks within the time window, among other examples. In some aspects, the configuration information may indicate a set of candidate selections, from which the UE or the base station may indicate the selection. In some aspects, the configuration information may indicate a time duration of the time window and/or may indicate a set of candidate time durations, from which the UE or the base station may indicate the time duration.

As shown by reference number 510, the UE may configure the UE based at least in part on the configuration information. In some aspects, the UE may be configured to perform one or more operations described herein based at least in part on the configuration information.

As shown by reference number 515, the UE may transmit, and the base station may receive, an indication of support for receiving one or more canceled HARQ codebooks within a time window preceding reception of a request. In some aspects, the UE may transmit the indication of support via RRC signaling (e.g., as part of an RRC connection process).

As shown by reference number 520, the UE and the base station may communicate an indication of a time duration of the time window. In some aspects, the time window may extend from reception of a request to a slot that is a number of slots before reception of the request. The number of slots may be considered the time duration of the time window. In some aspects, the UE and/or the base station may communicate and/or determine the time duration of the time window (e.g., the number of slots) via the request (e.g., DCI or uplink control information (UCI) with the request for lowest latency for a change in time duration), one or more MAC CEs (to reduce overhead of DCI or UCI with a slightly larger latency), or RRC signaling (e.g., to reduce overhead in dynamic signaling with a largest latency).

As shown by reference number 525, the UE may transmit, and the base station may receive, one or more PUSCHs (e.g., PUSCH communications) associated with one or more HARQ codebooks. For example, the UE may transmit one or more communications via one or more SPS-based PUSCH resources and/or one or more dynamically scheduled PUSCH resources. The one or more communications may be associated with low priority physical downlink control channels (PDCCHs) and/or high priority PDCCHs.

In some aspects, the base station may be configured to schedule communications for the UE associated with the one or more canceled HARQ codebooks such that the communications are scheduled to avoid multiple canceled HARQ codebooks within a same time window.

As shown by reference number 530, the base station may cancel at least one of the one or more HARQ codebooks. In some aspects, the base station may cancel at least one of the one or more HARQ codebooks based at least in part on intra-base station multiplexing (e.g., prioritization of one PDCCH over another based at least in part on priorities and/or being associated with dynamic-based or SPS-based PDSCH), reception of a cancelation indication, and/or a collision with an uplink communication (e.g., when an associated PDCCH is scheduled during a scheduled uplink communication).

As shown by reference number 535, the UE may transmit, and the base station may receive, a request to transmit one or more canceled HARQ codebooks that were scheduled for transmission within a time window preceding the request. In some aspects, the request may include an indication to transmit at least one canceled HARQ codebook, an indication of a number of slots within the time window, a UCI to HARQ feedback indicator, a resource indication for transmitting the one or more canceled HARQ codebooks, and/or a priority indicator for transmitting the one or more canceled HARQ codebooks. In some aspects, these parameters may be associated with matching parameters of the one or more canceled HARQ codebooks.

As shown by reference number 540, the base station may generate the one or more canceled HARQ codebooks and identify resources for transmission. In some aspects, the base station may identify the one or more canceled HARQ codebooks to include in the transmission based at least in part on an indication within the request, a communication protocol, RRC signaling (e.g., configuration information), and/or one or more MAC CEs. In some aspects, the base station may select the one or more canceled HARQ codebooks from a set of canceled HARQ codebooks within the time window. For example, the base station may select (e.g., based at least in part on being identified to include in the transmission) the one or more canceled HARQ codebooks consisting of an earliest canceled HARQ codebook within the time window, a latest canceled HARQ codebook within the time window, a canceled HARQ codebook having an index within the set of canceled HARQ codebooks, or all canceled HARQ codebooks within the time window, among other examples.

In some aspects, the base station may identify the resources for transmission based at least in part on an indication in the request. For example, the request may indicate a PRI for transmission of the request and/or may indicate to use a same PRI as originally configured for the one or more canceled HARQ codebooks (e.g., before being canceled). In some aspects, the base station may identify the resources for transmission based at least in part on a communication protocol and/or an indication in a communication that is separate from the request (e.g., RRC signaling or one or more MAC CEs, among other examples).

As shown by reference number 545, the base station may transmit, and the UE may receive, the one or more canceled HARQ codebooks via the resources associated with the request. For example, the base station may transmit the one or more canceled HARQ codebooks based at least in part on a PRI within the request or based at least in part on a PRI originally associated with the one or more canceled HARQ codebooks (e.g., before being canceled).

As shown by reference number 550, the UE may monitor for reception of the one or more canceled HARQ codebooks. For example, receiving the one or more canceled HARQ codebooks via the one or more resources associated with the request may include monitoring for reception of the one or more canceled HARQ codebooks within resources associated with a set of canceled HARQ codebooks within the time window (e.g., with the set of canceled HARQ codebooks including the one or more canceled HARQ codebooks). In this way, the UE may account for a lost UCI or DCI causing asynchronization in identifying the one or more canceled HARQ codebooks within the set of canceled HARQ codebooks.

Based at least in part on the UE being configured to request a canceled HARQ codebook, the UE may receive the canceled HARQ codebook, which may avoid the UE being unaware of whether the transmissions associated with the canceled HARQ codebook were received by the base station. This may reduce communication errors and/or unnecessary retransmissions of received communications, which may reduce consumption of computing, power, communication, and/or network resources to detect and correct.

As indicated above, FIG. 5 is provided as an example. Other examples may differ from what is described with regard to FIG. 5.

Figure 6:
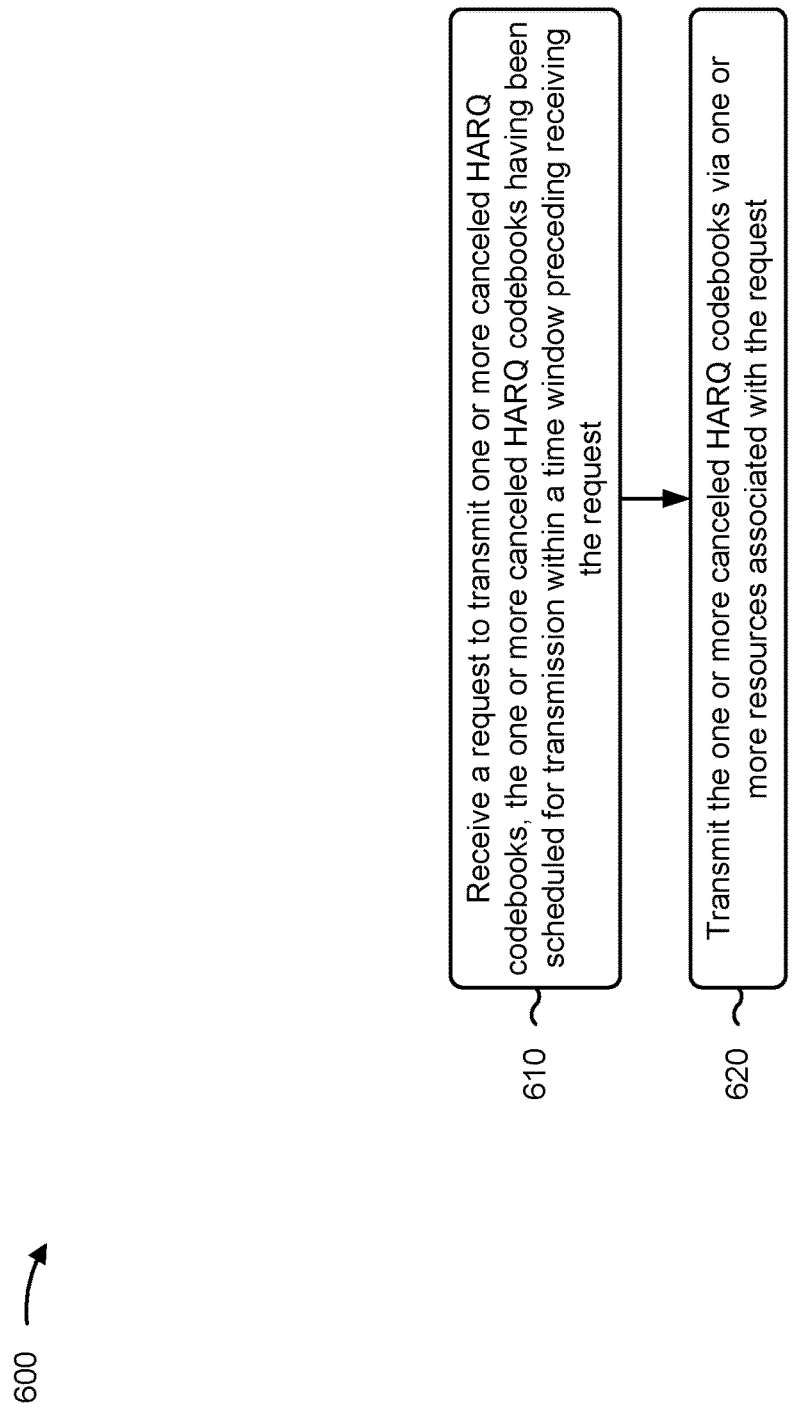
FIGS. 6-9 are diagrams illustrating example processes associated with a request for a canceled hybrid automatic repeat request codebook, in accordance with the present disclosure.

FIG. 6 is a diagram illustrating an example process 600 performed, for example, by a UE, in accordance with the present disclosure. Example process 600 is an example where the UE (e.g., UE 120) performs operations associated with request for a canceled HARQ codebook.

As shown in FIG. 6, in some aspects, process 600 may include receiving a request to transmit one or more canceled HARQ codebooks, the one or more canceled HARQ codebooks having been scheduled for transmission within a time window preceding receiving the request (block 610). For example, the UE (e.g., using communication manager 140 and/or reception component 1002, depicted in FIG. 10) may receive a request to transmit one or more canceled HARQ codebooks, the one or more canceled HARQ codebooks having been scheduled for transmission within a time window preceding receiving the request, as described above.

As further shown in FIG. 6, in some aspects, process 600 may include transmitting the one or more canceled HARQ codebooks via one or more resources associated with the request (block 620). For example, the UE (e.g., using communication manager 140 and/or transmission component 1004, depicted in FIG. 10) may transmit the one or more canceled HARQ codebooks via one or more resources associated with the request, as described above.

Process 600 may include additional aspects, such as any single aspect or any combination of aspects described below and/or in connection with one or more other processes described elsewhere herein.

In a first aspect, the one or more canceled HARQ codebooks are selected from a set of canceled HARQ codebooks within the time window, the one or more canceled HARQ codebooks consisting of an earliest canceled HARQ codebook within the time window, a latest canceled HARQ codebook within the time window, a canceled HARQ codebook having an index within the set of canceled HARQ codebooks, or all canceled HARQ codebooks within the time window.

In a second aspect, alone or in combination with the first aspect, the one or more canceled HARQ codebooks are selected from the set of canceled HARQ codebooks based at least in part on an indication within the request, a communication protocol, RRC signaling, or one or more MAC CEs.

In a third aspect, alone or in combination with one or more of the first and second aspects, the time window extends from reception of the request to a slot that is a number of slots before reception of the request.

In a fourth aspect, alone or in combination with one or more of the first through third aspects, process 600 includes receiving an indication of the number of slots via one or more of the request, one or more MAC CEs, or RRC signaling.

In a fifth aspect, alone or in combination with one or more of the first through fourth aspects, the one or more canceled HARQ codebooks were previously canceled based at least in part on one or more of intra-UE multiplexing, reception of a cancelation indication, or a collision with a downlink communication.

In a sixth aspect, alone or in combination with one or more of the first through fifth aspects, the request comprises one or more of an indication to transmit at least one canceled HARQ codebook, an indication of a number of slots within the time window, a DCI to HARQ feedback indicator, a resource indication for transmitting the one or more canceled HARQ codebooks, or a priority indicator for transmitting the one or more canceled HARQ codebooks.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
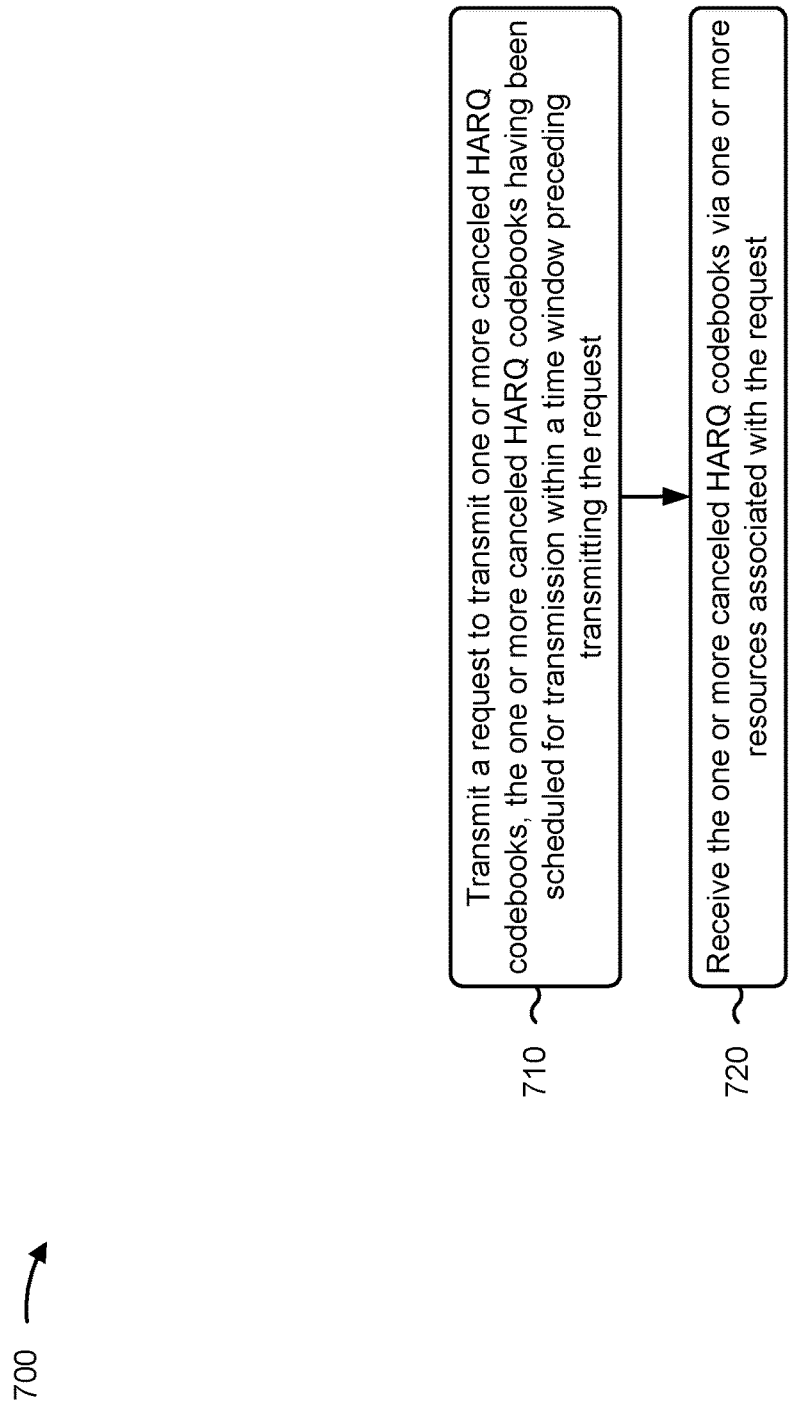

FIG. 7 is a diagram illustrating an example process 700 performed, for example, by a base station, in accordance with the present disclosure. Example process 700 is an example where the base station (e.g., base station 110) performs operations associated with request for a canceled HARQ codebook.

As shown in FIG. 7, in some aspects, process 700 may include transmitting a request to transmit one or more canceled HARQ codebooks, the one or more canceled HARQ codebooks having been scheduled for transmission within a time window preceding transmitting the request (block 710). For example, the base station (e.g., using communication manager 150 and/or transmission component 1104, depicted in FIG. 11) may transmit a request to transmit one or more canceled HARQ codebooks, the one or more canceled HARQ codebooks having been scheduled for transmission within a time window preceding transmitting the request, as described above.

As further shown in FIG. 7, in some aspects, process 700 may include receiving the one or more canceled HARQ codebooks via one or more resources associated with the request (block 720). For example, the base station (e.g., using communication manager 150 and/or reception component 1102, depicted in FIG. 11) may receive the one or more canceled HARQ codebooks via one or more resources associated with the request, as described above.

Process 700 may include additional aspects, such as any single aspect or any combination of aspects described below and/or in connection with one or more other processes described elsewhere herein.

In a first aspect, receiving the one or more canceled HARQ codebooks via the one or more resources associated with the request comprises monitoring for reception of the one or more canceled HARQ codebooks within resources associated with a set of canceled HARQ codebooks, including the one or more canceled HARQ codebooks, within the time window.

In a second aspect, alone or in combination with the first aspect, the base station is configured to schedule communications for a UE associated with the one or more canceled HARQ codebooks, wherein the communications are scheduled to avoid multiple canceled HARQ codebooks within the time window.

In a third aspect, alone or in combination with one or more of the first and second aspects, the one or more canceled HARQ codebooks are selected from a set of canceled HARQ codebooks within the time window, the one or more canceled HARQ codebooks consisting of an earliest canceled HARQ codebook within the time window, a latest canceled HARQ codebook within the time window, a canceled HARQ codebook having an index within the set of canceled HARQ codebooks, or all canceled HARQ codebooks within the time window.

In a fourth aspect, alone or in combination with one or more of the first through third aspects, the one or more canceled HARQ codebooks are selected from the set of canceled HARQ codebooks based at least in part on an indication within the request, a communication protocol, RRC signaling, or one or more MAC CEs.

In a fifth aspect, alone or in combination with one or more of the first through fourth aspects, the time window extends from reception of the request to a slot that is a number of slots before reception of the request.

In a sixth aspect, alone or in combination with one or more of the first through fifth aspects, process 700 includes receiving an indication of the number of slots via one or more of the request, one or more MAC CEs, or RRC signaling.

In a seventh aspect, alone or in combination with one or more of the first through sixth aspects, the one or more canceled HARQ codebooks were previously canceled based at least in part on one or more of intra-UE multiplexing, reception of a cancelation indication, or a collision with a downlink communication.

In an eighth aspect, alone or in combination with one or more of the first through seventh aspects, the request comprises one or more of an indication to transmit at least one canceled HARQ codebook, an indication of a number of slots within the time window, a DCI to HARQ feedback indicator, a resource indication for transmitting the one or more canceled HARQ codebooks, or a priority indicator for transmitting the one or more canceled HARQ codebooks.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
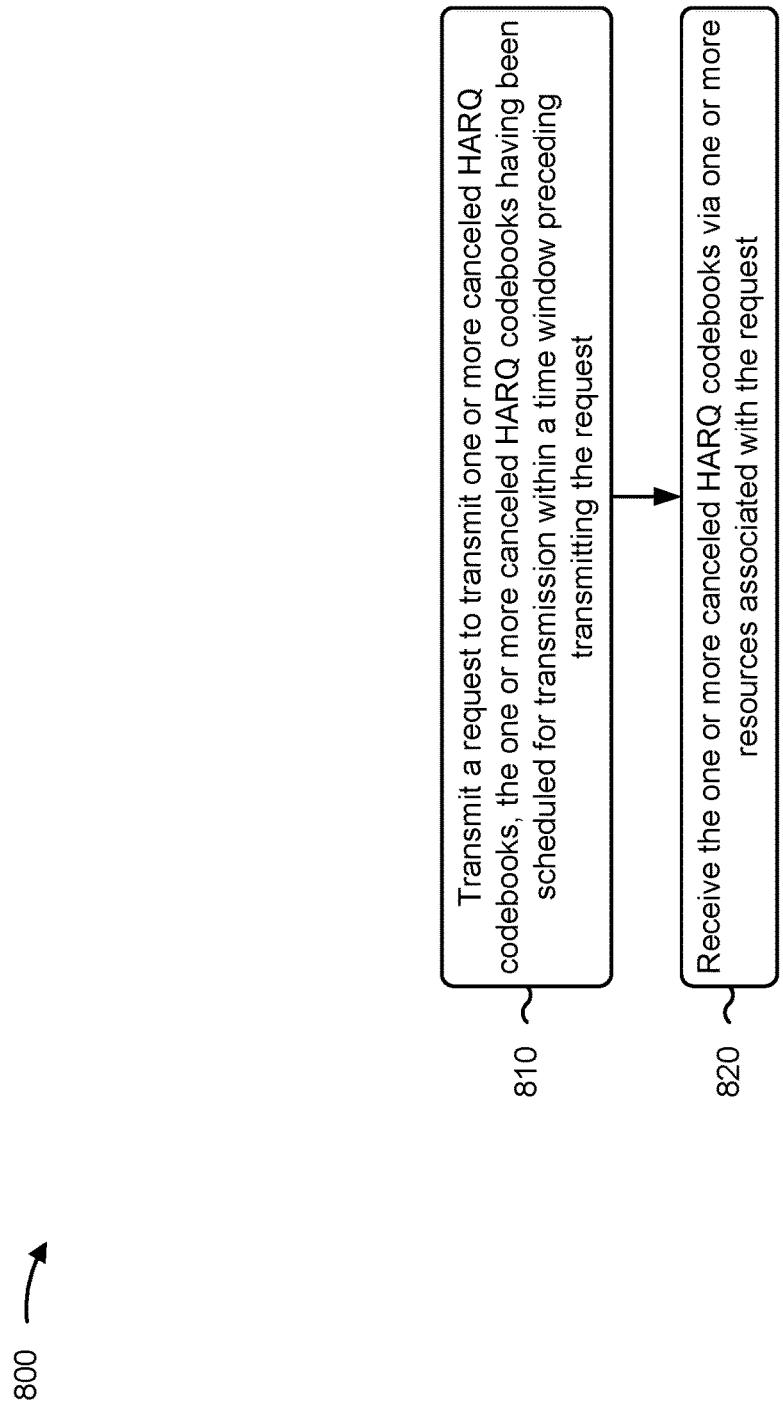

FIG. 8 is a diagram illustrating an example process 800 performed, for example, by a UE, in accordance with the present disclosure. Example process 800 is an example where the UE (e.g., UE 120) performs operations associated with request for a canceled HARQ codebook.

As shown in FIG. 8, in some aspects, process 800 may include transmitting a request to transmit one or more canceled HARQ codebooks, the one or more canceled HARQ codebooks having been scheduled for transmission within a time window preceding transmitting the request (block 810). For example, the UE (e.g., using communication manager 140 and/or transmission component 1004, depicted in FIG. 10) may transmit a request to transmit one or more canceled HARQ codebooks, the one or more canceled HARQ codebooks having been scheduled for transmission within a time window preceding transmitting the request, as described above.

As further shown in FIG. 8, in some aspects, process 800 may include receiving the one or more canceled HARQ codebooks via one or more resources associated with the request (block 820). For example, the UE (e.g., using communication manager 140 and/or reception component 1002, depicted in FIG. 10) may receive the one or more canceled HARQ codebooks via one or more resources associated with the request, as described above.

Process 800 may include additional aspects, such as any single aspect or any combination of aspects described below and/or in connection with one or more other processes described elsewhere herein.

In a first aspect, the one or more canceled HARQ codebooks are selected from a set of canceled HARQ codebooks within the time window, the one or more canceled HARQ codebooks consisting of an earliest canceled HARQ codebook within the time window, a latest canceled HARQ codebook within the time window, a canceled HARQ codebook having an index within the set of canceled HARQ codebooks, or all canceled HARQ codebooks within the time window.

In a second aspect, alone or in combination with the first aspect, the one or more canceled HARQ codebooks are selected from the set of canceled HARQ codebooks based at least in part on an indication within the request, a communication protocol, RRC signaling, or one or more MAC CEs.

In a third aspect, alone or in combination with one or more of the first and second aspects, the time window extends from transmission of the request to a slot that is a number of slots before transmission of the request.

In a fourth aspect, alone or in combination with one or more of the first through third aspects, process 800 includes receiving an indication of the number of slots via one or more of one or more MAC CEs, or RRC signaling, or transmitting the indication of the number of slots via one or more of the request, one or more MAC CEs, or RRC signaling.

In a fifth aspect, alone or in combination with one or more of the first through fourth aspects, the one or more canceled HARQ codebooks were previously canceled based at least in part on one or more of intra-base station multiplexing, transmission of a cancelation indication, or a collision with an uplink communication.

In a sixth aspect, alone or in combination with one or more of the first through fifth aspects, the request comprises one or more of an indication to transmit at least one canceled HARQ codebook, an indication of a number of slots within the time window, an uplink control information to HARQ feedback indicator, a resource indication for transmitting the one or more canceled HARQ codebooks, or a priority indicator for transmitting the one or more canceled HARQ codebooks.

In a seventh aspect, alone or in combination with one or more of the first through sixth aspects, receiving the one or more canceled HARQ codebooks via the one or more resources associated with the request comprises monitoring for reception of the one or more canceled HARQ codebooks within resources associated with a set of canceled HARQ codebooks, including the one or more canceled HARQ codebooks, within the time window.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
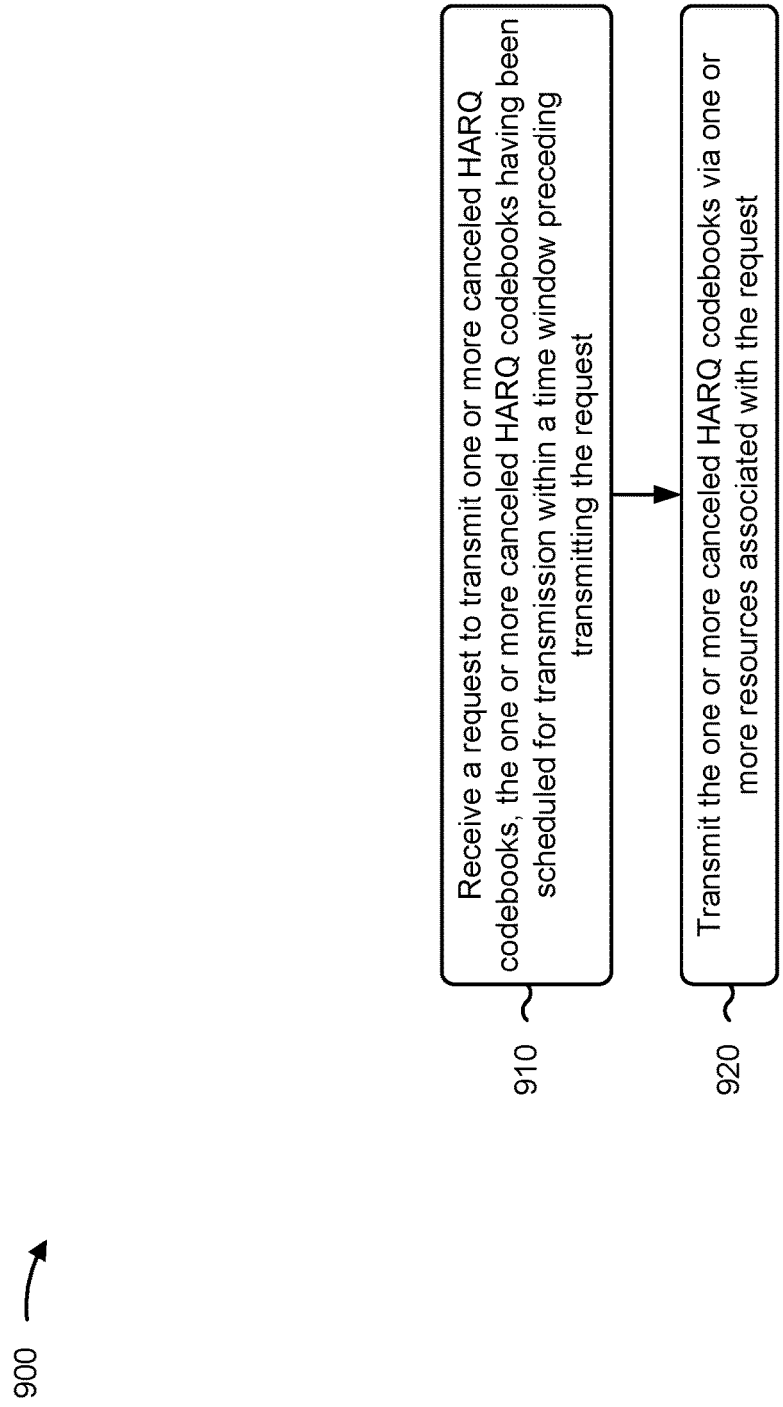

FIG. 9 is a diagram illustrating an example process 900 performed, for example, by a base station, in accordance with the present disclosure. Example process 900 is an example where the base station (e.g., base station 110) performs operations associated with request for a canceled HARQ codebook.

As shown in FIG. 9, in some aspects, process 900 may include receiving a request to transmit one or more canceled HARQ codebooks, the one or more canceled HARQ codebooks having been scheduled for transmission within a time window preceding transmitting the request (block 910). For example, the base station (e.g., using communication manager 150 and/or reception component 1102, depicted in FIG. 11) may receive a request to transmit one or more canceled HARQ codebooks, the one or more canceled HARQ codebooks having been scheduled for transmission within a time window preceding transmitting the request, as described above.

As further shown in FIG. 9, in some aspects, process 900 may include transmitting the one or more canceled HARQ codebooks via one or more resources associated with the request (block 920). For example, the base station (e.g., using communication manager 150 and/or transmission component 1104, depicted in FIG. 11) may transmit the one or more canceled HARQ codebooks via one or more resources associated with the request, as described above.

Process 900 may include additional aspects, such as any single aspect or any combination of aspects described below and/or in connection with one or more other processes described elsewhere herein.

In a first aspect, the base station is configured to schedule communications with a UE associated with the one or more canceled HARQ codebooks, wherein the communications are scheduled to avoid multiple canceled HARQ codebooks within the time window.

In a second aspect, alone or in combination with the first aspect, the one or more canceled HARQ codebooks are selected from a set of canceled HARQ codebooks within the time window, the one or more canceled HARQ codebooks consisting of an earliest canceled HARQ codebook within the time window, a latest canceled HARQ codebook within the time window, a canceled HARQ codebook having an index within the set of canceled HARQ codebooks, or all canceled HARQ codebooks within the time window.

In a third aspect, alone or in combination with one or more of the first and second aspects, the one or more canceled HARQ codebooks are selected from the set of canceled HARQ codebooks based at least in part on an indication within the request, a communication protocol, RRC signaling, or one or more MAC CEs.

In a fourth aspect, alone or in combination with one or more of the first through third aspects, the time window extends from reception of the request to a slot that is a number of slots before reception of the request.

In a fifth aspect, alone or in combination with one or more of the first through fourth aspects, process 900 includes transmitting an indication of the number of slots via one or more of one or more MAC CEs, or RRC signaling, or receiving the indication of the number of slots via one or more of the request, one or more MAC CEs, or RRC signaling.

In a sixth aspect, alone or in combination with one or more of the first through fifth aspects, the one or more canceled HARQ codebooks were previously canceled based at least in part on one or more of intra-base station multiplexing, reception of a cancelation indication, or a collision with an uplink link communication.

In a seventh aspect, alone or in combination with one or more of the first through sixth aspects, process 900 includes an indication to transmit at least one canceled HARQ codebook, an indication of a number of slots within the time window, a DCI to HARQ feedback indicator, a resource indication for transmitting the one or more canceled HARQ codebooks, or a priority indicator for transmitting the one or more canceled HARQ codebooks.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
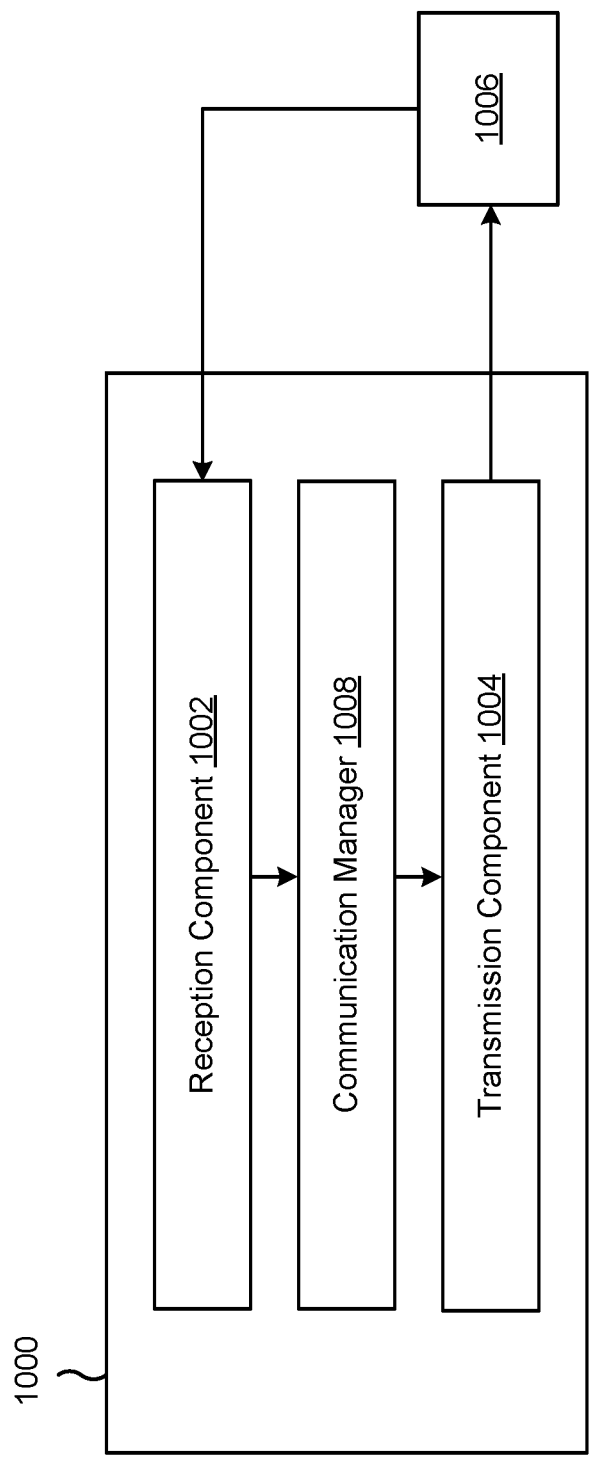
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140).

In some aspects, the apparatus 1000 may be configured to perform one or more operations described herein in connection with FIGS. 4 and 5. Additionally, or alternatively, the apparatus 1000 may be configured to perform one or more processes described herein, such as process 600 of FIG. 6, process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a request to transmit one or more canceled HARQ codebooks, the one or more canceled HARQ codebooks having been scheduled for transmission within a time window preceding receiving the request. The transmission component 1004 may transmit the one or more canceled HARQ codebooks via one or more resources associated with the request.

The reception component 1002 may receive an indication of the number of slots via one or more of the request, one or more MAC CEs, or RRC signaling.

The transmission component 1004 may transmit a request to transmit one or more canceled HARQ codebooks, the one or more canceled HARQ codebooks having been scheduled for transmission within a time window preceding transmitting the request. The reception component 1002 may receive the one or more canceled HARQ codebooks via one or more resources associated with the request.

The reception component 1002 may receive an indication of the number of slots via one or more of one or more MAC CEs, or RRC signaling.

The transmission component 1004 may transmit the indication of the number of slots via one or more of the request, one or more MAC CEs, or RRC signaling.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
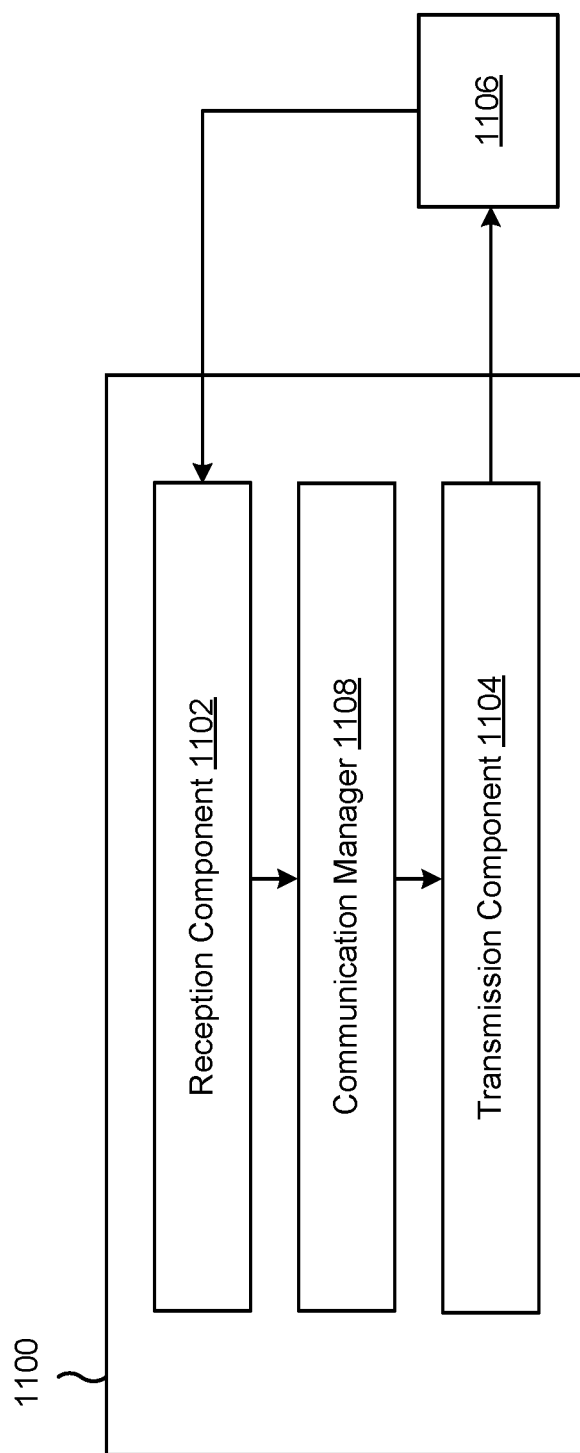

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

As further shown, the apparatus 1100 may include a communication manager 1108 (e.g., the communication manager 150).

In some aspects, the apparatus 1100 may be configured to perform one or more operations described herein in connection with FIGS. 4 and 5. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit a request to transmit one or more canceled HARQ codebooks, the one or more canceled HARQ codebooks having been scheduled for transmission within a time window preceding transmitting the request. The reception component 1102 may receive the one or more canceled HARQ codebooks via one or more resources associated with the request.

The reception component 1102 may receive an indication of the number of slots via one or more of the request, one or more MAC CEs, or RRC signaling.

The reception component 1102 may receive a request to transmit one or more canceled HARQ codebooks, the one or more canceled HARQ codebooks having been scheduled for transmission within a time window preceding transmitting the request. The transmission component 1104 may transmit the one or more canceled HARQ codebooks via one or more resources associated with the request.

The transmission component 1104 may transmit an indication of the number of slots via one or more of one or more MAC CEs, or RRC signaling.

The reception component 1102 may receive the indication of the number of slots via one or more of the request, one or more MAC CEs, or RRC signaling.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a request to transmit one or more canceled hybrid automatic repeat request (HARQ) codebooks, the one or more canceled HARQ codebooks having been scheduled for transmission within a time window preceding receiving the request; and transmitting the one or more canceled HARQ codebooks via one or more resources associated with the request.

Aspect 2: The method of Aspect 1, wherein the one or more canceled HARQ codebooks are selected from a set of canceled HARQ codebooks within the time window, the one or more canceled HARQ codebooks consisting of: an earliest canceled HARQ codebook within the time window, a latest canceled HARQ codebook within the time window, a canceled HARQ codebook having an index within the set of canceled HARQ codebooks, or all canceled HARQ codebooks within the time window.

Aspect 3: The method of Aspect 2, wherein the one or more canceled HARQ codebooks are selected from the set of canceled HARQ codebooks based at least in part on: an indication within the request, a communication protocol, radio resource control signaling, or one or more medium access control control elements.

Aspect 4: The method of any of Aspects 1-3, wherein the time window extends from reception of the request to a slot that is a number of slots before reception of the request.

Aspect 5: The method of Aspect 4, further comprising: receiving an indication of the number of slots via one or more of: the request, one or more medium access control control elements, or radio resource control signaling.

Aspect 6: The method of any of Aspects 1-5, wherein the one or more canceled HARQ codebooks were previously canceled based at least in part on one or more of: intra-UE multiplexing, reception of a cancelation indication, or a collision with a downlink communication.

Aspect 7: The method of any of Aspects 1-6, wherein the request comprises one or more of: an indication to transmit at least one canceled HARQ codebook, an indication of a number of slots within the time window, a DCI to HARQ feedback indicator, a resource indication for transmitting the one or more canceled HARQ codebooks, or a priority indicator for transmitting the one or more canceled HARQ codebooks.

Aspect 8: A method of wireless communication performed by a base station, comprising: transmitting a request to transmit one or more canceled hybrid automatic repeat request (HARQ) codebooks, the one or more canceled HARQ codebooks having been scheduled for transmission within a time window preceding transmitting the request; and receiving the one or more canceled HARQ codebooks via one or more resources associated with the request.

Aspect 9: The method of Aspect 8, wherein receiving the one or more canceled HARQ codebooks via the one or more resources associated with the request comprises: monitoring for reception of the one or more canceled HARQ codebooks within resources associated with a set of canceled HARQ codebooks, including the one or more canceled HARQ codebooks, within the time window.

Aspect 10: The method of any of Aspects 8-9, wherein the base station is configured to schedule communications for a user equipment (UE) associated with the one or more canceled HARQ codebooks, wherein the communications are scheduled to avoid multiple canceled HARQ codebooks within the time window.

Aspect 11: The method of any of Aspects 8-9, wherein the one or more canceled HARQ codebooks are selected from a set of canceled HARQ codebooks within the time window, the one or more canceled HARQ codebooks consisting of: an earliest canceled HARQ codebook within the time window, a latest canceled HARQ codebook within the time window, a canceled HARQ codebook having an index within the set of canceled HARQ codebooks, or all canceled HARQ codebooks within the time window.

Aspect 12: The method of Aspect 11, wherein the one or more canceled HARQ codebooks are selected from the set of canceled HARQ codebooks based at least in part on: an indication within the request, a communication protocol, radio resource control signaling, or one or more medium access control control elements.

Aspect 13: The method of any of Aspects 8-12, wherein the time window extends from reception of the request to a slot that is a number of slots before reception of the request.

Aspect 14: The method of Aspect 13, further comprising: receiving an indication of the number of slots via one or more of: the request, one or more medium access control control elements, or radio resource control signaling.

Aspect 15: The method of any of Aspects 8-14, wherein the one or more canceled HARQ codebooks were previously canceled based at least in part on one or more of: intra-UE multiplexing, reception of a cancelation indication, or a collision with a downlink communication.

Aspect 16: The method of any of Aspects 8-15, wherein the request comprises one or more of: an indication to transmit at least one canceled HARQ codebook, an indication of a number of slots within the time window, a DCI to HARQ feedback indicator, a resource indication for transmitting the one or more canceled HARQ codebooks, or a priority indicator for transmitting the one or more canceled HARQ codebooks.

Aspect 17: A method of wireless communication performed by a user equipment (UE), comprising: transmitting a request to transmit one or more canceled hybrid automatic repeat request (HARQ) codebooks, the one or more canceled HARQ codebooks having been scheduled for transmission within a time window preceding transmitting the request; and receiving the one or more canceled HARQ codebooks via one or more resources associated with the request.

Aspect 18: The method of Aspect 17, wherein the one or more canceled HARQ codebooks are selected from a set of canceled HARQ codebooks within the time window, the one or more canceled HARQ codebooks consisting of: an earliest canceled HARQ codebook within the time window, a latest canceled HARQ codebook within the time window, a canceled HARQ codebook having an index within the set of canceled HARQ codebooks, or all canceled HARQ codebooks within the time window.

Aspect 19: The method of Aspect 18, wherein the one or more canceled HARQ codebooks are selected from the set of canceled HARQ codebooks based at least in part on: an indication within the request, a communication protocol, radio resource control signaling, or one or more medium access control control elements.

Aspect 20: The method of any of Aspects 17-19, wherein the time window extends from transmission of the request to a slot that is a number of slots before transmission of the request.

Aspect 21: The method of Aspect 20, further comprising: receiving an indication of the number of slots via one or more of: one or more medium access control control elements, or radio resource control signaling, or transmitting the indication of the number of slots via one or more of: the request, one or more medium access control control elements, or radio resource control signaling.

Aspect 22: The method of any of Aspects 17-21, wherein the one or more canceled HARQ codebooks were previously canceled based at least in part on one or more of: intra-base station multiplexing, transmission of a cancelation indication, or a collision with an uplink communication.

Aspect 23: The method of any of Aspects 17-22, wherein the request comprises one or more of: an indication to transmit at least one canceled HARQ codebook, an indication of a number of slots within the time window, an uplink control information to HARQ feedback indicator, a resource indication for transmitting the one or more canceled HARQ codebooks, or a priority indicator for transmitting the one or more canceled HARQ codebooks.

Aspect 24: The method of any of Aspects 17-23, wherein receiving the one or more canceled HARQ codebooks via the one or more resources associated with the request comprises: monitoring for reception of the one or more canceled HARQ codebooks within resources associated with a set of canceled HARQ codebooks, including the one or more canceled HARQ codebooks, within the time window.

Aspect 25: A method of wireless communication performed by a base station, comprising: receiving a request to transmit one or more canceled hybrid automatic repeat request (HARQ) codebooks, the one or more canceled HARQ codebooks having been scheduled for transmission within a time window preceding transmitting the request; and transmitting the one or more canceled HARQ codebooks via one or more resources associated with the request.

Aspect 26: The method of Aspect 25, wherein the base station is configured to schedule communications with a user equipment (UE) associated with the one or more canceled HARQ codebooks, wherein the communications are scheduled to avoid multiple canceled HARQ codebooks within the time window.

Aspect 27: The method of any of Aspects 25-26, wherein the one or more canceled HARQ codebooks are selected from a set of canceled HARQ codebooks within the time window, the one or more canceled HARQ codebooks consisting of: an earliest canceled HARQ codebook within the time window, a latest canceled HARQ codebook within the time window, a canceled HARQ codebook having an index within the set of canceled HARQ codebooks, or all canceled HARQ codebooks within the time window.

Aspect 28: The method of Aspect 27, wherein the one or more canceled HARQ codebooks are selected from the set of canceled HARQ codebooks based at least in part on: an indication within the request, a communication protocol, radio resource control signaling, or one or more medium access control control elements.

Aspect 29: The method of Aspect 27, wherein the time window extends from reception of the request to a slot that is a number of slots before reception of the request.

Aspect 30: The method of Aspect 29, further comprising: transmitting an indication of the number of slots via one or more of: one or more medium access control control elements, or radio resource control signaling, or receiving the indication of the number of slots via one or more of: the request, one or more medium access control control elements, or radio resource control signaling.

Aspect 31: The method of Aspect 27, wherein the one or more canceled HARQ codebooks were previously canceled based at least in part on one or more of: intra-base station multiplexing, reception of a cancelation indication, or a collision with an uplink link communication.

Aspect 32: The method of Aspect 27, wherein the request comprises one or more of: an indication to transmit at least one canceled HARQ codebook, an indication of a number of slots within the time window, a DCI to HARQ feedback indicator, a resource indication for transmitting the one or more canceled HARQ codebooks, or a priority indicator for transmitting the one or more canceled HARQ codebooks.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
  one or more memories; and
  one or more processors, coupled to the one or more memories, configured to:
    receive a request to transmit a hybrid automatic repeat request (HARQ) codebook, the HARQ codebook comprising an earliest HARQ codebook having been scheduled for transmission within a time window, the request indicating a number of slots within the time window; and transmit the HARQ codebook via one or more resources associated with the request.

2. The UE of claim 1, wherein the request further indicates to transmit:
a latest HARQ codebook within the time window, or
a canceled HARQ codebook having an index within a set of canceled HARQ codebooks.

3. The UE of claim 1, wherein the canceled HARQ codebook is selected from a set of HARQ codebooks based at least in part on:
an indication within the request,
a communication protocol,
radio resource control signaling, or
one or more medium access control control elements.

4. The UE of claim 1, wherein the request further comprises one or more of:
an indication to transmit the HARQ codebook,
a downlink control information to HARQ feedback indicator, or
a resource indication for transmitting the HARQ codebook.

5. The UE of claim 1, wherein the one or more processors, to receive the request, are configured to:
receive the request in downlink control information (DCI).

6. The UE of claim 1, wherein the HARQ codebook comprises one or more of a colliding HARQ codebook, a dropped HARQ codebook, or a canceled HARQ codebook.

7. The UE of claim 1, wherein the request further indicates a priority indicator for transmission of the HARQ codebook.

8. A network entity for wireless communication, comprising:
one or more memories; and
one or more processors, coupled to the one or more memories, configured to:
transmit a request to transmit a hybrid automatic repeat request (HARQ) codebook, the HARQ codebook comprising an earliest HARQ codebook having been scheduled for transmission within a time window, the request indicating a number of slots within the time window; and
receive the HARQ codebook via one or more resources associated with the request.

9. The network entity of claim 8, wherein the one or more processors, to receive the HARQ codebook via the one or more resources associated with the request, are configured to:
monitor for reception of the HARQ codebook within resources associated with a set of HARQ codebooks.

10. The network entity of claim 8, wherein the network entity is configured to schedule communications for a user equipment (UE) associated with the HARQ codebook,
wherein the communications are scheduled to avoid multiple HARQ codebooks within the time window.

11. The network entity of claim 8, wherein the request further indicates to transmit:
a latest HARQ codebook within the time window, or
a canceled HARQ codebook having an index within a set of canceled HARQ codebooks.

12. The network entity of claim 8, wherein the HARQ codebook is selected from a set of HARQ codebooks based at least in part on:
an indication within the request,
a communication protocol,
radio resource control signaling, or
one or more medium access control control elements.

13. The network entity of claim 8, wherein the request further comprises one or more of:
an indication to transmit the HARQ codebook,
a downlink control information to HARQ feedback indicator, or
a resource indication for transmitting the HARQ codebook.

14. The network entity of claim 8, wherein the one or more processors, to transmit the request, are configured to:
transmit the request in downlink control information (DCI).

15. The network entity of claim 8, wherein the HARQ codebook comprises one or more of a colliding HARQ codebook, a dropped HARQ codebook, or a canceled HARQ codebook.

16. The network entity of claim 8, wherein the request further indicates a priority indicator for transmission of the HARQ codebook.

17. A method of wireless communication performed by a user equipment (UE), comprising:
receiving a request to transmit a hybrid automatic repeat request (HARQ) codebook, the HARQ codebook comprising an earliest HARQ codebook having been scheduled for transmission within a time window, the request indicating number of slots within the time window; and
transmitting the HARQ codebook via one or more resources associated with the request.

18. The method of claim 17, wherein the request further indicates to transmit:
a latest HARQ codebook within the time window, or
a canceled HARQ codebook having an index within a set of canceled HARQ codebooks.

19. The method of claim 17, wherein the HARQ codebook is selected from a set of HARQ codebooks based at least in part on:
an indication within the request,
a communication protocol,
radio resource control signaling, or
one or more medium access control control elements.

20. The method of claim 17, wherein the request comprises one or more of:
an indication to transmit the HARQ codebook,
a downlink control information to HARQ feedback indicator, or
a resource indication for transmitting the HARQ codebook.

21. The method of claim 17, wherein receiving the request comprises:
receiving the request in downlink control information (DCI).

22. The method of claim 17, wherein the HARQ codebook comprises one or more of a colliding HARQ codebook, a dropped HARQ codebook, or a canceled HARQ codebook.

23. The method of claim 17, wherein the request further indicates a priority indicator for transmission of the HARQ codebook.

24. A method of wireless communication performed by a network entity, comprising:
transmitting a request to transmit a hybrid automatic repeat request (HARQ) codebook, the HARQ codebook comprising an earliest HARQ codebook having been scheduled for transmission within a time window, the request indicating number of slots within the time window; and receiving the HARQ codebook via one or more resources associated with the request.

25. The method of claim 24, wherein receiving the HARQ codebook via the one or more resources associated with the request comprises:

monitoring for reception of the HARQ codebook within resources associated with a set of HARQ codebooks.

26. The method of claim 24, wherein the network entity is configured to schedule communications for a user equipment (UE) associated with the HARQ codebook, wherein the communications are scheduled to avoid multiple HARQ codebooks within the time window.

27. The method of claim 24, wherein the request further indicates to transmit:

a latest HARQ codebook within the time window, or
a canceled HARQ codebook having an index within a set of canceled HARQ codebooks.

28. The method of claim 24, wherein the request further comprises one or more of:

an indication to transmit the HARQ codebook,
a downlink control information to HARQ feedback indicator, or
a resource indication for transmitting the HARQ codebook.

29. The method of claim 24, wherein the HARQ codebook comprises one or more of a colliding HARQ codebook, a dropped HARQ codebook, or a canceled HARQ codebook.

30. The method of claim 24, wherein the request further indicates a priority indicator for transmission of the HARQ codebook.

* * * * *

UNITED STATES PATENT AND TRADEMARK OFFICE
CERTIFICATE OF CORRECTION

| | | |
|---|---|---|
| PATENT NO. | : 12,328,194 B2 | Page 1 of 1 |
| APPLICATION NO. | : 17/394021 | |
| DATED | : June 10, 2025 | |
| INVENTOR(S) | : Konstantinos Dimou et al. | |

It is certified that error appears in the above-identified patent and that said Letters Patent is hereby corrected as shown below:

In the Specification

In Column 14, Line 43, "As shown by reference number 350," should be changed to -- As shown by reference number 355, --;

In Column 14, Line 50, "As shown by reference number 355," should be changed to -- As shown by reference number 360, --;

In Column 14, Line 59, "As shown by reference number 360," should be changed to -- As shown by reference number 365, --;

In Column 27, Line 63, "components of the apparatus 1006" should be changed to -- components of the apparatus 1100, --;

In Column 28, Line 5, "of the apparatus 1006," should be changed to -- of the apparatus 1000, --.

Signed and Sealed this
Twenty-sixth Day of August, 2025

Coke Morgan Stewart
*Acting Director of the United States Patent and Trademark Office*